US009112624B2

(12) United States Patent
Morita

(10) Patent No.: US 9,112,624 B2
(45) Date of Patent: Aug. 18, 2015

(54) TIME DIVISION RECEIVER AND TIME DIVISION RECEIVING METHOD

(75) Inventor: Tadashi Morita, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 219 days.

(21) Appl. No.: 13/814,338

(22) PCT Filed: Dec. 14, 2011

(86) PCT No.: PCT/JP2011/006980
§ 371 (c)(1),
(2), (4) Date: Feb. 5, 2013

(87) PCT Pub. No.: WO2012/090409
PCT Pub. Date: Jul. 5, 2012

(65) Prior Publication Data
US 2013/0136118 A1 May 30, 2013

(30) Foreign Application Priority Data

Dec. 28, 2010 (JP) ................. 2010-292716

(51) Int. Cl.
H04J 3/00 (2006.01)
H04B 1/16 (2006.01)
(52) U.S. Cl.
CPC .. H04J 3/00 (2013.01); H04B 1/163 (2013.01)
(58) Field of Classification Search
CPC ............... H04J 3/00; H04J 3/02; H04B 1/00; H04B 1/06; H04B 1/10; H04B 1/16; H04B 1/163

USPC ............ 370/310, 345; 455/130, 150.1, 196.1, 455/197.1, 197.2, 197.3, 269, 272, 278.1; 375/316, 346
See application file for complete search history.

(56) References Cited

U.S. PATENT DOCUMENTS 7,065,334 B1 * 6/2006 Otaka et al. ................. 455/232.1
7,592,877 B2 * 9/2009 Shiramizu et al. ............. 331/57
7,877,063 B2 * 1/2011 Kim et al. ...................... 455/73

(Continued)

FOREIGN PATENT DOCUMENTS

JP 2006-135814 A 5/2006

OTHER PUBLICATIONS

International Search Report for PCT/JP2011/006980 dated Jan. 17, 2012.

Primary Examiner — Chi H Pham
Assistant Examiner — Weibin Huang
(74) Attorney, Agent, or Firm — Pearne & Gordon LLP

(57) ABSTRACT

Provided are a time division receiver and a time division receiving method capable of mitigating leaks between branches for a time division multiplexed signal for which a plurality of branches have been time-division multiplexed even when processing using a single high-frequency circuit. A time division receiver comprises a mixer that down-converts a time-division multiplexed signal resulting from a plurality of branch signals being time-division multiplexed, a demultiplexer that demultiplexes the time-division multiplexed signal down-converted by the mixer, into respective branch signals; and an initializer that initializes a charge remaining in a parasitic capacitance, the parasitic capacitance being generated on a path between the mixer and the demultiplexer, when a first branch signal has passed through the path, before a second branch signal passes through the path.

7 Claims, 34 Drawing Sheets

(56) References Cited

U.S. PATENT DOCUMENTS

| | | | |
|---|---|---|---|
| 2003/0035499 A1* | 2/2003 | Staszewski et al. | 375/346 |
| 2006/0099925 A1* | 5/2006 | Tsai et al. | 455/272 |
| 2010/0173601 A1* | 7/2010 | Beamish et al. | 455/326 |

* cited by examiner

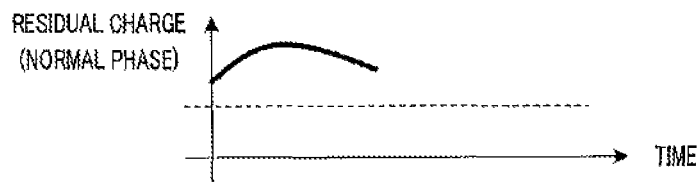
FIG. 7
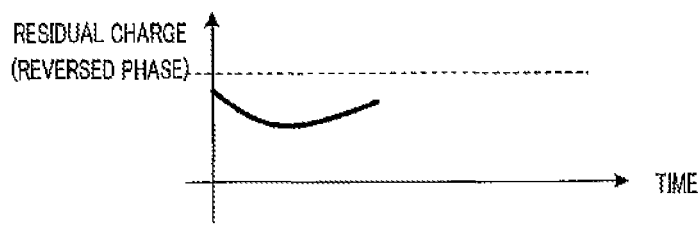
FIG. 8
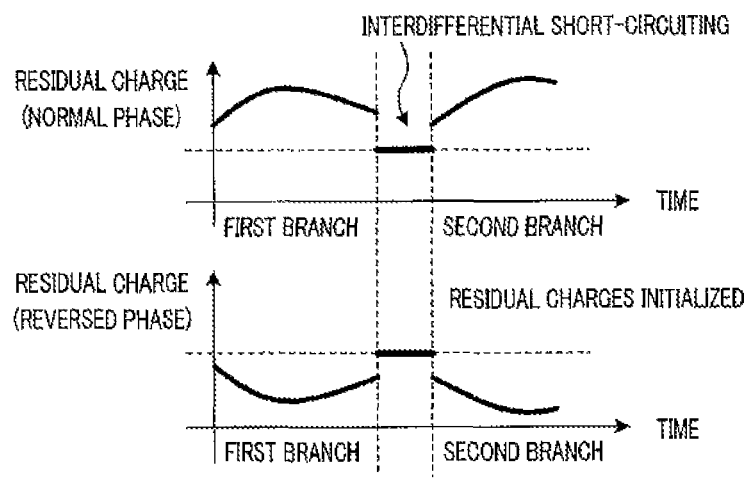
FIG. 9
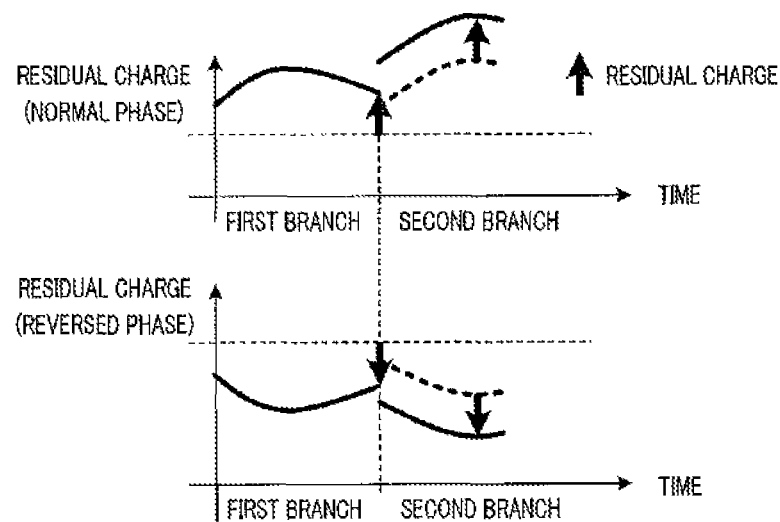

TIME DIVISION RECEIVER AND TIME DIVISION RECEIVING METHOD

TECHNICAL FIELD

The present invention relates to a time-division receiver and a time-division receiving method for performing processing for receiving a time-division multiplexed signal.

BACKGROUND ART

In recent years, the MIMO (multiple-input and multiple-output) technique has been established and the MIMO technique has been used in many wireless communication standards. In order to practice the MIMO technique, a plurality of radio-frequency circuits are required. Accordingly, the circuit size or power consumption increases as the number of radio-frequency circuits is increased. Therefore, in order to suppress the increase cult size or power consumption, there arises a need to provide a time-division system that can perform processing for a plurality of branches (also referred to as streams) by time-division use of one radio-frequency circuit.

Patent Literature 1 and Patent Literature 2 each disclose a technique that time-divisionally uses an RF (radio frequency) circuit. Patent Literature 1 discloses an RF circuit for time-division receiver including a mixer. Also Patent Literature 2 discloses a technique for a direct sampling mixer (DSM).

It has been found that where a time-division receiver, which is represented by the above techniques, is used in a MIMO system, leakage between branches largely affects the reception characteristics of the MIMO system. Therefore, in order to prevent deterioration in reception characteristics, it is necessary to reduce leakage between branches in the time-division receiver as much as possible in the MIMO system. Leakage between branches refers to mixing of signals between the branches. Leakage between branches occurs where a time-divisionally used radio-frequency circuit includes an element having frequency response in a time-division receiver.

Frequency response is provided by parasitic capacitances. Therefore, ideally, if no parasitic capacitances are generated in the radio-frequency circuit, neither frequency response is provided nor leakage between the branches occurs.

CITATION LIST

Patent Literature

PTL 1
Japanese Patent Application Laid-Open No. 2006-135814
PTL 2
U.S. Patent Publication No. 2003/35499

SUMMARY OF INVENTION

Technical Problem

However, parasitic capacitances exist in an actual element included in a radio-frequency circuit and it is very difficult to completely eliminate the frequency response. Therefore, if an element including parasitic capacitances is shared between branches, signal components before branch switching are accumulated in the parasitic capacitance as a charge, and the accumulated charge exerts influence after the branch switching. Consequently, in the time-division receiver, leakage between the branches occurs, causing the problem of making MIMO decode processing difficult, resulting in deterioration in reception characteristics of the MIMO system. It is known that the problem is more prominent if the time-division receiver is employed in a high-speed broadband wireless transmission system. Therefore, in order to provide a high-speed time-division receiver, mitigation of leakage between branches can be considered an essential technique.

An object of the present invention is to provide a time-division receiver and a time-division receiving method that even where a time-division multiplexed signal resulting from time-division multiplexing of a plurality of branches is processed by one radio-frequency circuit, can reduce leakage between the branches.

Solution to Problem

A time-division receiver according to one aspect of the present invention employs a configuration including: a mixer that down-converts a tune-division multiplexed signal resulting from a plurality of branch signals being time-division multiplexed; a demultiplexing section that demultiplexes the time-division multiplexed signal down-converted by the mixer, into respective branch signals; and an initializing section that initializes a charge remaining ire a parasitic capacitance, the parasitic capacitance being generated on a path between the mixer and the demultiplexing section, when a first branch signal has passed through the path, before a second branch signal passes through the path.

A time-division receiving method according to another aspect of the present invention includes: down-converting a time-division multiplexed signal resulting from a plurality of branch signals being time-division multiplexed; demultiplexing the time-division multiplexed signal that has been down-converted into respective branch signals; and initializing a charge remaining in a parasitic capacitance, the parasitic capacitance being generated on a path through which the down-converted time-division multiplexed signal passes, when a first branch signal has passed through the path, before a second branch signal passes through the path.

Advantageous Effects of Invention

According to the present invention, even where time-division multiplexed signal resulting from time-division multiplexing of a plurality of branches is processed by one radio-frequency circuit, leakage between the branches can be reduced.

BRIEF DESCRIPTION OF DRAWINGS

FIG. 7 is a diagram illustrating a charge in a parasitic capacitance in each of a normal-phase circuit and reversed-phase circuit;

FIG. 8 is a diagram illustrating a charge remaining in each parasitic capacitances in a time-division receiver according to embodiment 1;

FIG. 9 is a diagram illustrating a charge remaining in each of parasitic capacitances in a time-division receiver to which the present invention is applied;

DESCRIPTION OF EMBODIMENTS

Embodiments of the present invention will be described in detail below with reference to the drawings.

Embodiment 1

Figure 1:
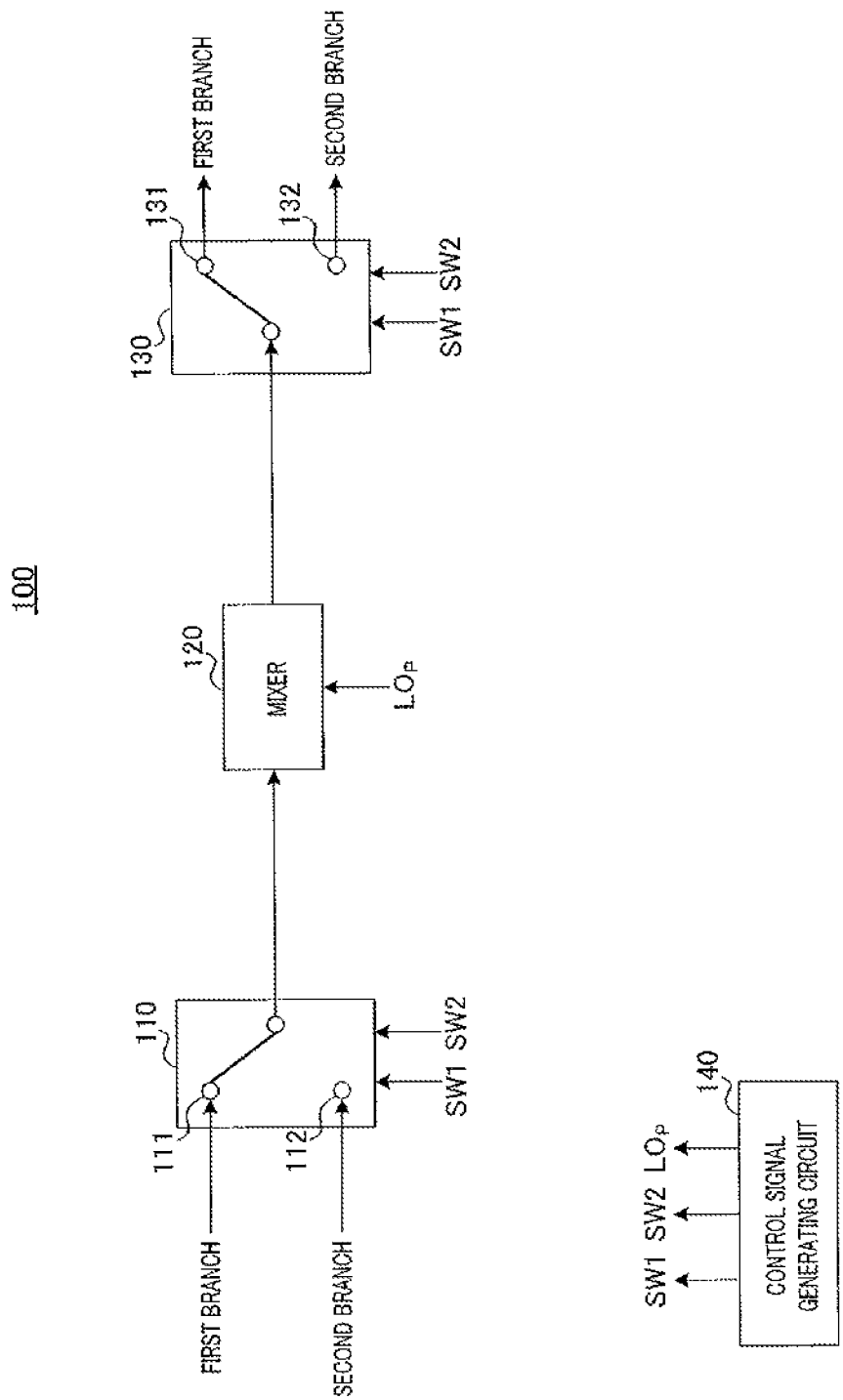
FIG. 1 is a block diagram illustrating a configuration of a time-division receiver to which the present invention is applied.

FIG. 1 is a block diagram illustrating configuration of a time-division receiver to which the present invention is applied. Time-division receiver 100 in FIG. 1 employs a configuration with the branch count of two which a first branch and a second branch are time-division multiplexed into a single system.

In FIG. 1, time-division receiver 100 includes time-division multiplexing section 110, mixer 120, time-division demultiplexing section 130 and control signal generating cult 140.

Figure 2:
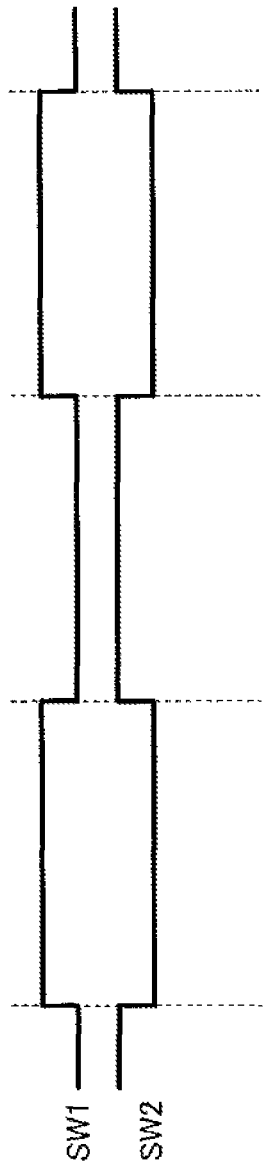
FIG. 2 is a diagram illustrating control signals supplied from a control signal generating circuit.

Control signal generating circuit 140 supplies control signals (clocks) to time-division multiplexing section 110 and time-division demultiplexing section 130. More specifically, control signal generating circuit 140 generates SW1 and SW2, and supplies SW1 and SW2 to time-division multiplexing section 110 and time-division demultiplexing section 130. FIG. 2 is a diagram illustrating control signals SW1 and SW2 supplied from control signal generating circuit 140.

Control signal generating circuit 140 also generates local signal $LO_P$. Then, control signal generating circuit 140 supplies local signal $Lo_p$ to mixer 120.

Time-division multiplexing section 110 includes input terminals 111 and 112. A radio-frequency signal for a first branch is input to input terminal 111. Also, a radio-frequency signal for a second branch is input to input terminal 112.

Time-division multiplexing section 110 time-division multiplexes the radio-frequency signals for the first and second branches in response to SW1 and SW2 to generate a single time-division multiplexed signal. More specifically, time-division multiplexing section 110 outputs the radio-frequency signal for the first branch, which has been input from input terminal 111, to mixer 120 during a period in which SW1 is active. Also, time-division multiplexing section 110 outputs the radio-frequency signal for the second branch, which has been input from input terminal 112, to mixer 120 during a period in which SW2 is active. Here, a branch switching rate needs to be a rate equal to or exceeding a symbol rate for each of the radio-frequency signals. As described above, time-division multiplexing section 110 generates a time-division multiplexed signal and outputs the time-division multiplexed signal to mixer 120.

Mixer 120 performs frequency conversion (down-conversion) of the time-division multiplexed signal using local signal $Lo_p$ to generate a baseband time-division multiplexed signal (hereinafter abbreviated, as baseband signal) and outputs the baseband signal to time-division demultiplexing section 130.

Time-division demultiplexing section 130 includes output terminals 131 and 132. Then, time-division demultiplexing section 130 demultiplexes the baseband signal into first and second branches in response to SW1 and SW2. More specifically, time-division demultiplexing section 130 outputs the baseband signal to output terminal 131 during a period in which SW1 is active. Time-division demultiplexing section 130 also outputs the baseband signal to output terminal 132 during a period in which SW2 is active. As described above, time-division demultiplexing section 130 demultiplexes the baseband signal into the first and second branches at a branch switching rate equal to that of time-division multiplexing section 110.

A configuration of time-division receiver 100 to which the present invention is applied has been described above. Next, a time-division receiver according to the present embodiment will be described.

Figure 3:
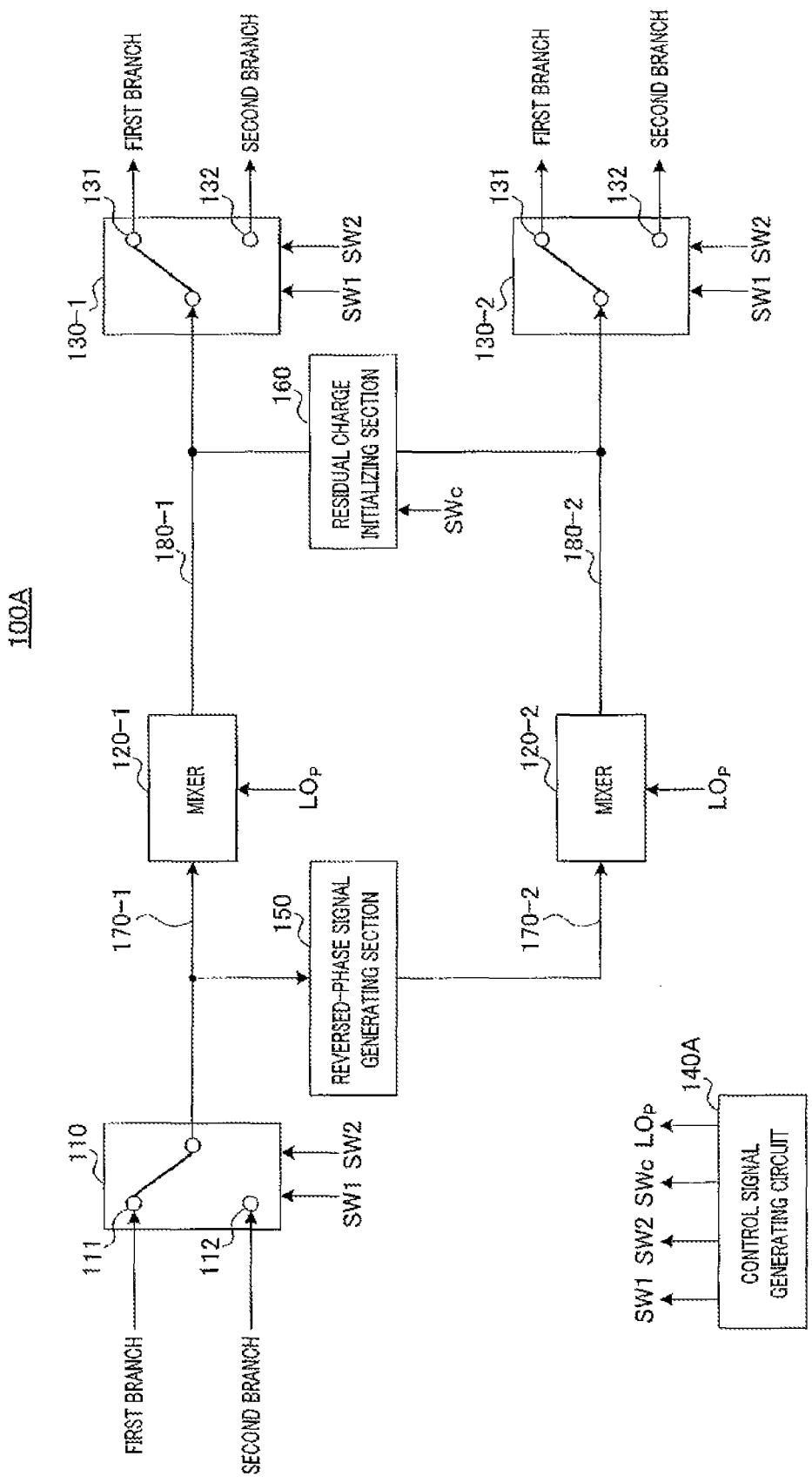
FIG. 3 is a block diagram illustrating a configuration of a time-division receiver according to embodiment of the presort invention.

FIG. 3 is a block diagram illustrating a configuration of time-division receiver 100A according to the present embodiment. In FIG. 3, components that are the same as those in FIG. 1 are provided with reference numerals that are the same as those in FIG. 1 and a description thereof will be omitted.

In FIG. 3, time-division receiver 100A includes time-division multiplexing section 110, mixers 120-1 and 120-2, time-division demultiplexing sections 130-1 and 130-2, control signal generating circuit 140A, reversed-phase signal generating section 150, and residual charge initializing section 160.

In FIG. 3, mixer 120-1 and time-division demultiplexing section 130-1 process a normal-phase signal in a differential system. Also, mixer 120-2 and time-division demultiplexing section 130-2 process a reversed-phase signal in the differential system. Hereinafter, processing sections that process normal-phase signal are collectively referred to as a normal-phase circuit, and processing sections that process a reversed-phase signal are collectively referred to as a reversed-phase circuit.

Furthermore, in FIG. 3, a path between time-division multiplexing section 110 and mixer 120-1 and a path between reversed-phase signal generating section 150 and mixer 120-2 are referred to as time-division shared signal lines 170-1 and 170-2, respectively. Also, a path between mixer 120-1 and time-division demultiplexing section 130-1 (output path for mixer 120-1) is referred to as time-division shared signal line 180-1. Also, a path between mixer 120-2 and time-division demultiplexing section 130-2 (output path for mixer 120-2) is referred to as time-division shared signal line 180-2.

Figure 4:
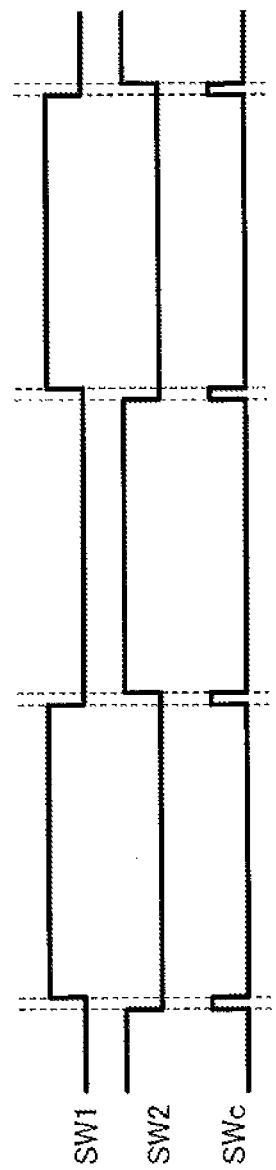
FIG. 4 is a diagram illustrating control signals supplied from a control signal generating circuit.

Control signal generating circuit 140A supplies control signals to time-division multiplexing section 110, time division demultiplexing sections 130-1 and 130-2, and residual charge initializing section 160. More specifically, control signal generating circuit 140A generates control signals SW1, SW2 and SWc. Then, control signal generating circuit 140A supplies SW1 and SW2 to time-division multiplexing section 110 and time-division demultiplexing sections 130-1 and 130-2. Control signal generating circuit 140A also supplies SWc to residual charge initializing section 160. Furthermore, control signal generating circuit. 140A generates local signal $Lo_p$ and supplies local signal $Lo_p$ to mixers 120-1 and 120-2. FIG. 4 is a diagram illustrating control signals SW1, SW2 and SWc supplied from control signal generating circuit 140A. Details of SW1, SW2 and SWc will be described later.

Control signal generating circuit 140E generates local signal $LO_p$. Then, control signal generating circuit 140A supplies local signal $LO_p$ to mixers 120-1 and 120-2.

Time-division multiplexing section 110 time-division multiplexes radio-frequency signals for the first and second branches in response to SW1 and SW2 to generate a single time-division multiplexed signal. More specifically, during a period in which SW1 is active, time-division multiplexing section 110 outputs the radio-frequency signal for the first branch to mixer 120-1 and reversed-phase signal generating section 150. Also, during a period in which SW2 is active, time-division multiplexing section 110 outputs the radio-frequency signal for the second branch to mixer 120-1 and reversed-phase signal generating section 150. During a period in which neither SW1 nor SW2 is active (that is, a period in which SWc is active), time-division multiplexing section 110 provides no output to mixer 120-1 and reversed-phase signal generating section 150.

Reversed-phase signal generating section 150 reverses a phase of the time-division multiplexed signal to generate a reversed-phase time-division multiplexed signal and outputs the reversed-phase time-division multiplexed signal to mixer 120-2.

As with mixer 120, mixers 120-1 and 120-2 perform frequency conversion (down-conversion) of the respective time-division multiplexed signals using local signal $LO_p$ to generate a baseband time-division multiplexed signal (baseband signal). More specifically, mixer 120-1 down-converts the normal-phase time-division multiplexed signal to generate a normal-phase baseband signal. Also, mixer 120-2 down-converts the reversed-phase time-division multiplexed signal to generate a reversed-phase baseband signal. The normal-phase baseband signal is output to time-division demultiplexing section 130-1 via time-division shared signal line 180-1. The reversed-phase baseband signal is output to time-division demultiplexing section 130-2 via time-division shared signal line 180-2.

As with time-division demultiplexing section 130, each of time-division demultiplexing sections 130-1 and 130-2 includes output terminals 131 and 132. Time-division demultiplexing sections 130-1 and 130-2 each demultiplex the respective baseband signals into the first and second branches in response to SW1 and SW2. More specifically, demultiplexing sections 130-1 and 130-2 output the respective baseband signals to respective output terminals 131 during a period in which SW1 is active. Also, time-division demultiplexing sections 130-1 and 130-2 output the respective baseband signals to respective output terminals 132 during period in which SW2 is active. As described above, time-division demultiplexing sections 130-1 and 130-2 demultiplex the respective time-division multiplexed signals into the first and second branches at a branch switching rate equal to that of time-division multiplexing section 110.

Residual charge initializing section 160 initializes charges remaining in parasitic capacitances in time-division receiver 100A.

Here, parasitic capacitances generated in time-division receiver 100A will be described. As described above, time-division shared signal lines 170-1 and 170-2, mixers 120-1 and 120-2 and time-division shared signal lines 180-1 and 180-2 are shared between the first and second branches. Time-division shared signal lines 170-1 and 170-2, mixers 120-1 and 120-2 and time-division shared signal lines 180-1 and 180-2 shared between the first and second branches are referred to as time-division shared sections below.

If an element having frequency response exists in a time-division shared section, as described above, a parasitic capacitance is generated in the element and leakage between branches increases due to the generated parasitic capacitance. Here, from among the time-division shared sections, elements having frequency response, that is, elements in which a parasitic capacitance is generated will be discussed.

To be exact, time-division shared signal lines 170-1, 170-2, mixers 120-1 and 120-2, and time-division shared signal lines 180-1 and 180-2 all have frequency response. However, there is a large difference between an LO (local) frequency used by mixers 120-1 and 120-2 for down-conversion and the branch switching rate. For example, the LO frequency is around 2 GHz while the branch switching rate is around 100 MHz. In other words, in time-division receiver 100A, mixers 120-1 and 120-2 can be considered as mere elements for frequency shifting from a first frequency to a second frequency. Then, the branch switching rate is extremely slow compared to the LO frequency, and thus, the frequency response of mixers 120-1 and 120-2 can be ignored. In other words, parasitic capacitances in mixers 120-1 and 120-2 can be ignored. Furthermore, since each of the first and second branch signals passing through time-division shared signal lines 170-1 and 170-2 has a radio frequency, as with mixers 120-1 and 120-2, the frequency response of time-division shared signal lines 170-1 and 170-2 can be ignored.

Meanwhile, the down-converted baseband signals pass through time-division shared signal lines 180-1 and 180-2. Each of the baseband signals has a low frequency, for example, around 5 MHz. Therefore, the frequency of the baseband signals is close to the branch switching rate compared to that of the radio-frequency signals, and thus, the frequency response of time-division shared signal lines 180-1 and 180-2 should be taken into consideration. Thus, on time-division shared signal lines 180-1 and 180-2, parasitic capacitances can be generated.

Figure 5:
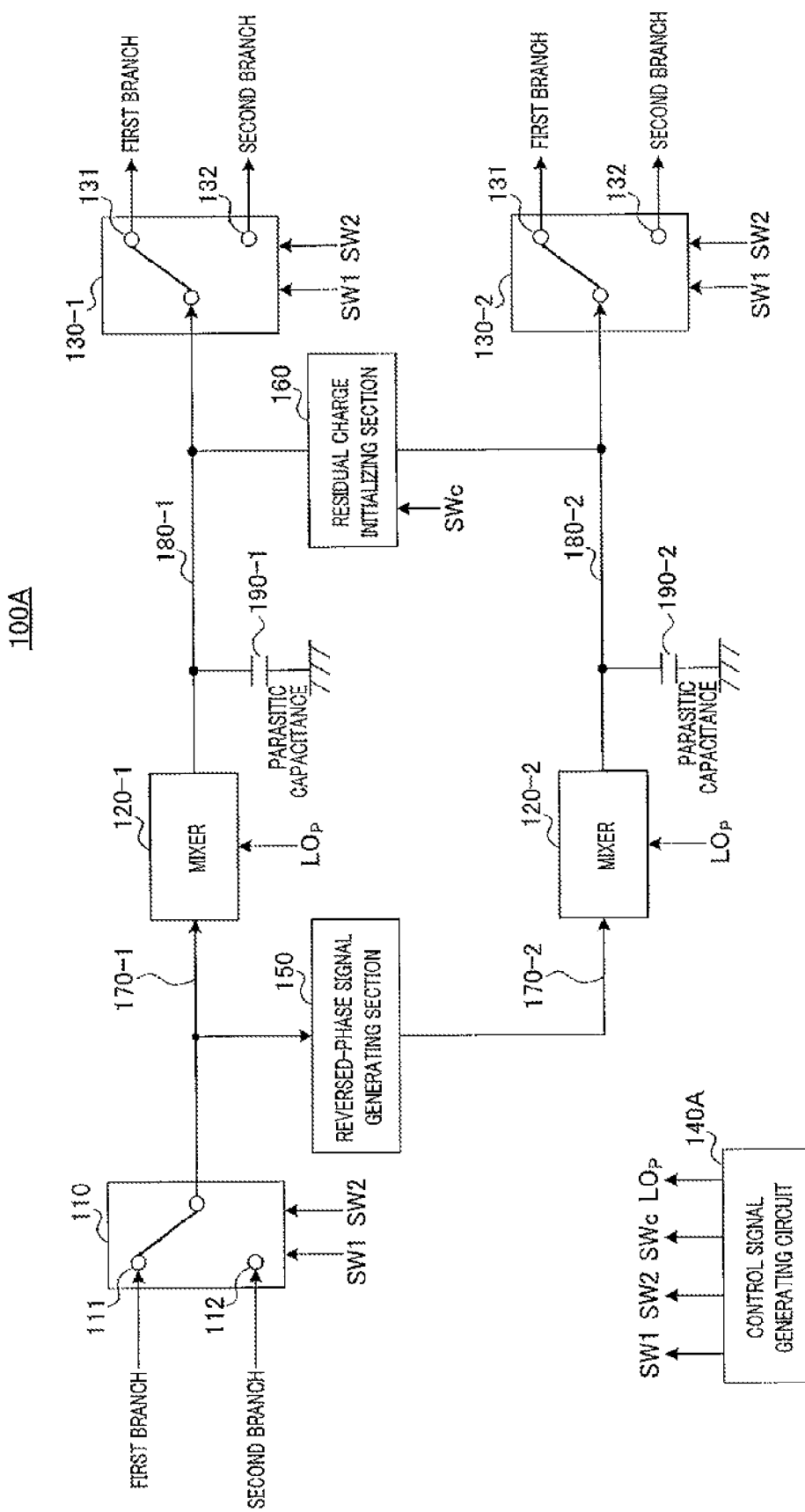
FIG. 5 is a diagram conceptually illustrating parasitic capacitances generated on time-division shared signal lines.

FIG. 5 is a diagram conceptually illustrating parasitic capacitances generated on time-division shared signal lines 180-1 and 180-2. In FIG. 5, parasitic capacitances 190-1 and 190-2 are parasitic capacitances generated on time-division shared signal lines 180-1 and 180-2. In parasitic capacitances 190-1 and 190-2, signal components before branch switching remain.

Therefore, in the present embodiment, in time-division receiver 100A, residual charge initializing section 160 is connected to time-division shared signal lines 180-1 and 180-2 (output paths for mixers 120-1 and 120-2). In the present embodiment, residual charge initializing section 160 is configured to initialize charges remaining in parasitic capacitances 190-1 and 190-2 (hereinafter also referred to as residual charges).

Figure 6:
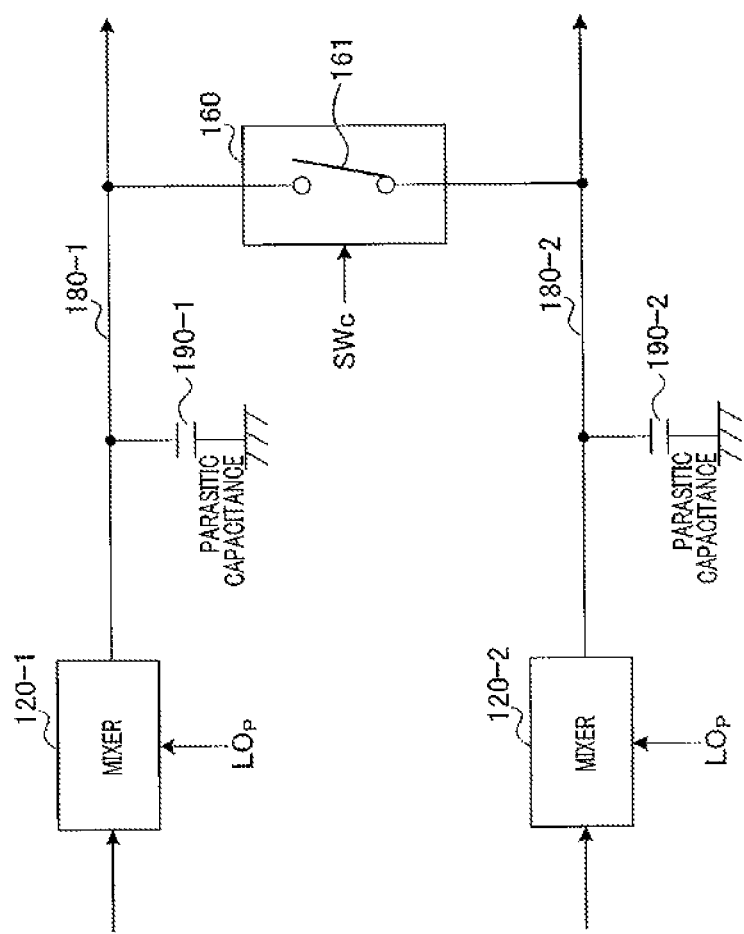
FIG. 6 is a diagram illustrating an internal configuration of a residual charge initializing section according to embodiment 1.

FIG. 6 is a diagram illustrating an internal configuration of residual charge initializing section 160 and connection to the same.

Residual charge initializing section 160 includes switch 161.

One of connection destinations of switch 161 is the output path for mixer 120-1 in the normal-phase circuit and the other is the output path for mixer 120-2 in the reversed-phase circuit.

Then, switch 161 is turned on/off in response to SWc, and consequently, the normal-phase circuit and the reversed-phase circuit are in a conducting or non-conducting state. More specifically, during a period in which SWc is active, switch 161 is on, whereby the normal-phase circuit and the reversed-phase circuit are in a conducting state. Also, during a period in which SWc, is non-active, switch 161 is off, whereby the normal-phase circuit and the reversed-phase circuit are its a non-conducting state.

Next, the control signals output from control signal generating circuit 140A will be described with reference to FIG. 4.

In FIG. 4, SW1 is a control signal for time-division multiplexing section 110 and time-division demultiplexing sections 130-1 and 130-2 to select the first branch. Also, SW2 is a control signal for time-division multiplexing section 110 and time-division demultiplexing sections 130-1 and 130-2 to select the second branch.

As described above, SW1 and SW2 for switching between the first and second branches are control signals common to time-division multiplexing section 110 and time-division demultiplexing sections 130-1 and 130-2. SW1 and SW2 each have a rate higher than the symbol rate.

Furthermore, as illustrated in FIG. 4, SW1 and SW2 are not active simultaneously, and there are periods in which both SW1 and SW2 are non-active. Each of the periods in which both SW1 and SW2 are non-active is a period in which the time-division multiplexed signal is quiescent. Also, each of the periods in which both SW1 and SW2 are non-active and the time-division multiplexed signal is quiescent (hereinafter referred to as "quiescent period") is a period in which SWc is active. Residual charge initializing section 160 initializes the charges accumulated in parasitic capacitances 190-1 and 190-2 (residual charges) during a period in which SWc is active, that is, a quiescent period.

Time necessary for initializing the residual charges should be assigned to the period in which SWc is active. However, majority of charge is moved to a parasitic capacitance in an early period in which charge accumulation has started. Therefore, even where residual charges are initialized for residual charge reduction during a period shorter than a period of time consumed for actual accumulation of the residual charges, the initialization of the residual charges can provide an effect of reduction in leakage between the branches. Accordingly, the period in which SWc is active may be shorter than time required to completely initialize the residual charges.

Furthermore, since each of the periods in which SWc is active is a period in which both SW1 and SW2 are non-active (quiescent period), if the period in which SWc is active is long, the period in which SW1 or SW2 is active is short. Shortening the period in which SW1 or SW2 is active causes deterioration in pass gain characteristic of the signal for the branch for which the active period has been shortened. Meanwhile, shortening the period in which SWc is active disables sufficient initialization of the residual charges, resulting in deterioration in characteristic of leakage between the branches. Therefore, it is necessary to determine the period in which SWc is active taking a trade-off between the pass gain characteristic and the characteristic of leakage between the branches into consideration.

Next, an operation of residual charge initializing section 160 will be described.

FIG. 7 is a diagram illustrating charges (residual charges) generally accumulated in a parasitic capacitance in a normal-phase circuit and a parasitic capacitance in a reversed-phase circuit in a differential system. As can be seen from FIG. 7, residual charges in the normal-phase circuit and the reversed-phase circuit exhibit symmetry. Thus, the normal-phase circuit and the reversed-phase circuit are in a conducting state, whereby the residual charges in the normal-phase circuit and the reversed-phase circuit are cancelled out.

FIG. 8 is a diagram illustrating charges (residual charges) accumulated in parasitic capacitances 190-1 and 190-2 in time-division receiver 100A according to the present embodiment.

Residual charge initializing section 160 initializes the residual charges during a period in which SWc is active. More specifically, during the period in which SWc is active, switch 161 is on, whereby the normal-phase circuit and the reversed-phase circuit are in a conducting state (interdifferential short-circuiting). As a result, charges accumulated in parasitic capacitances 190-1 and 190-2 (residual charges) are cancelled out, whereby the residual charges are initialized.

As described above, an SWc active period is provided between an SW1 active period and an SW2 active period. In the SWc active period, interdifferential short-circuiting is performed. Consequently, in time-division receiver 100A, after initialization of the charges accumulated in parasitic capacitances 190-1, 190-2 (residual charges), respective signals after branch switching pass through time-division shared signal lines 180-1 and 180-2. Thus, time-division receiver 100A can avoid mixing of signals before branch switching and signals after the branch switching, enabling reduction in leakage between the branches. Consequently, time-division receiver 100A enables suppression of deterioration MIMO reception characteristics.

Meanwhile, FIG. 9 is a diagram illustrating charges accumulated in parasitic capacitances (residual charges) in the normal-phase circuit and the reversed-phase circuit in time-division receiver 100 in FIG. 1. In other words, FIG. 9 illustrates an example where the residual charges are not initialized. In FIG. 9, solid lines indicate residual charges before and after branch switching in time-division receiver 100. In FIG. 9, dotted lines indicate residual charges after branch switching in the case of an ideal time-division receiver in which the time-division shared sections of time-division receiver 100 have no frequency response.

In time-division receiver 100, after switching from the first branch to the second branch, the signal for the second branch is input with signal components for the first branch remaining in the parasitic capacitances. Therefore, as indicated by the solid lines in FIG. 9, the residual charges are large after the branch switching, which indicate that signal components for the first and second branches are mixed.

As described above, from comparison between FIG. 8 and FIG. 9, time-division receiver 100A according to the present embodiment can reduce leakage between the branches and can suppress deterioration in MIMO reception characteristics.

As described above, residual charge section 160 initializes residual charges generated on paths through which time-division multiplexed signals pass, for each branch switching. More specifically, time-division receiver 100A makes residual charges generated on the paths through which respective time-division multiplexed signals pass, be cancelled out between the differential circuits in the differential system. In residual charge initializing section 160, in a period in which SWc is active, that is, a quiescent period, switch 161 connects the output path for mixer 120-1 and the output path for mixer 120-2. Consequently, time-division receiver 100A makes a charge remaining in the parasitic capacitance 190-1 in the normal-phase circuit and a charge remaining in parasitic capacitance 190-2 in the reversed-phase circuit be cancelled out. As described above, residual charge initializing section 160 initializes charges remaining in the respective parasitic capacitances, which are generated on the respective output paths, when respective first branch signals have passed the respective paths, before respective second branch signals pass the respective paths. Consequently, time-division receiver 100A can reduce leakage between the branches.

In general, in a differential system, a normal-phase circuit and a reversed-phase circuit basically exhibit symmetry, but do not necessarily exhibit perfect symmetry to be exact. Thus, time-division receiver 100A does not necessarily completely initialize residual charges. However, even where a normal-phase circuit and a reversed-phase circuit do not exhibit perfect symmetry, time-division receiver 100A can provide an effect of mitigating leakage between the branches with an extremely simple configuration.

Figure 10:
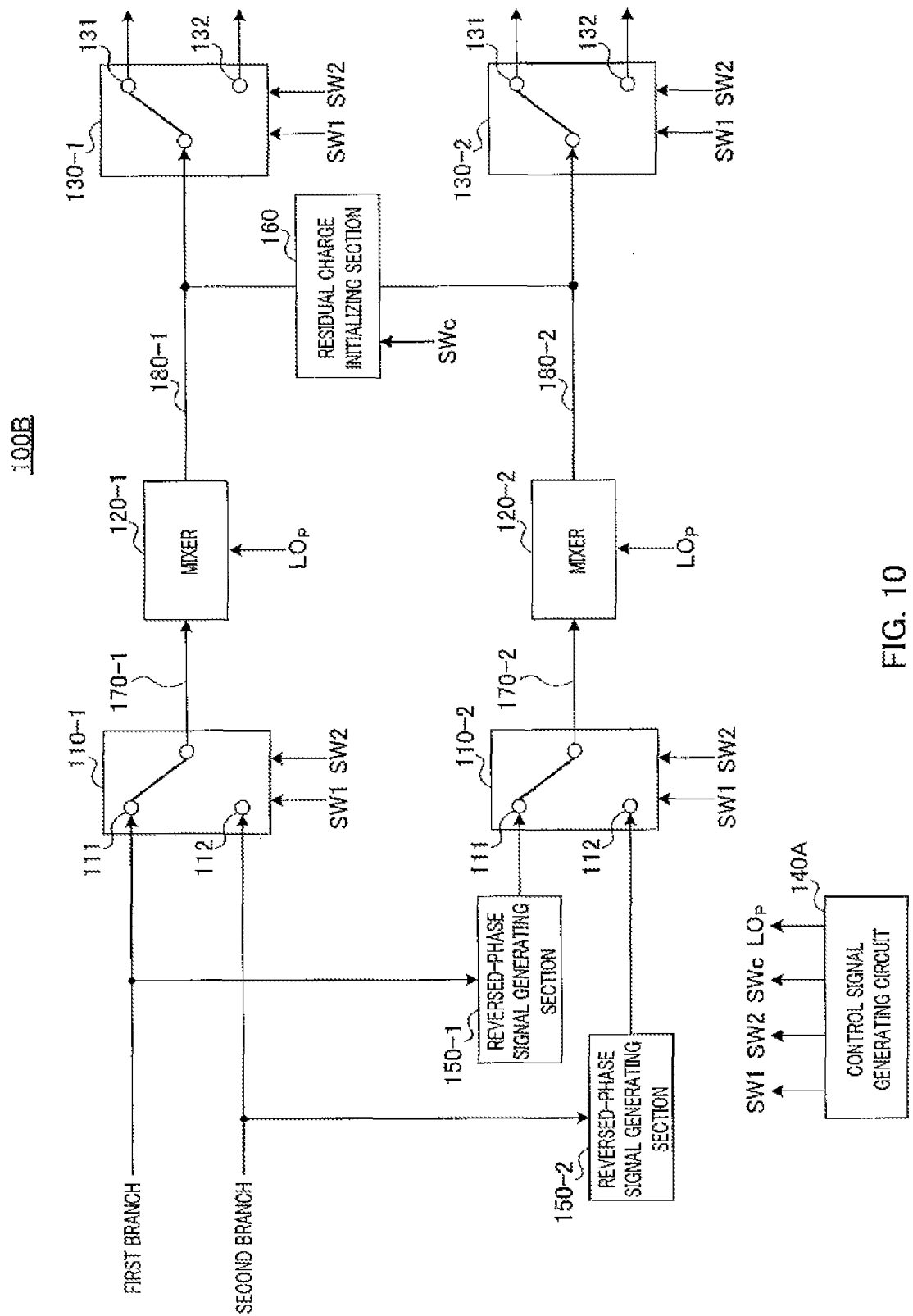
FIG. 10 is a block diagram illustrating another configuration of a time-division receiver according to embodiment 1.

FIG. 10 is a block diagram illustrating another configuration of a time-division receiver according to the present embodiment. In FIG. 10, components that are the same as those in FIG. 3 are provided with reference numerals that are the same as those in FIG. 3 and a description thereof will be omitted. Time-division receiver 100A in FIG. 3 includes reversed-phase signal generating section 150 in the following stage of time-division multiplexing section 110. Meanwhile, time-division receiver 100B in FIG. 10 includes reversed-phase signal generating sections 150-1 and 150-2 in the preceding stage of time-division multiplexing sections 110-1 and 110-2. Operations of time-division multiplexing sections 110-1 and 110-2 and reversed-phase, signal generating sections 150-1 and 150-2 are similar to those of time-division multiplexing section 110 and reversed-phase signal generating section 150, respectively, and thus, a description thereof will be omitted.

Figure 11:
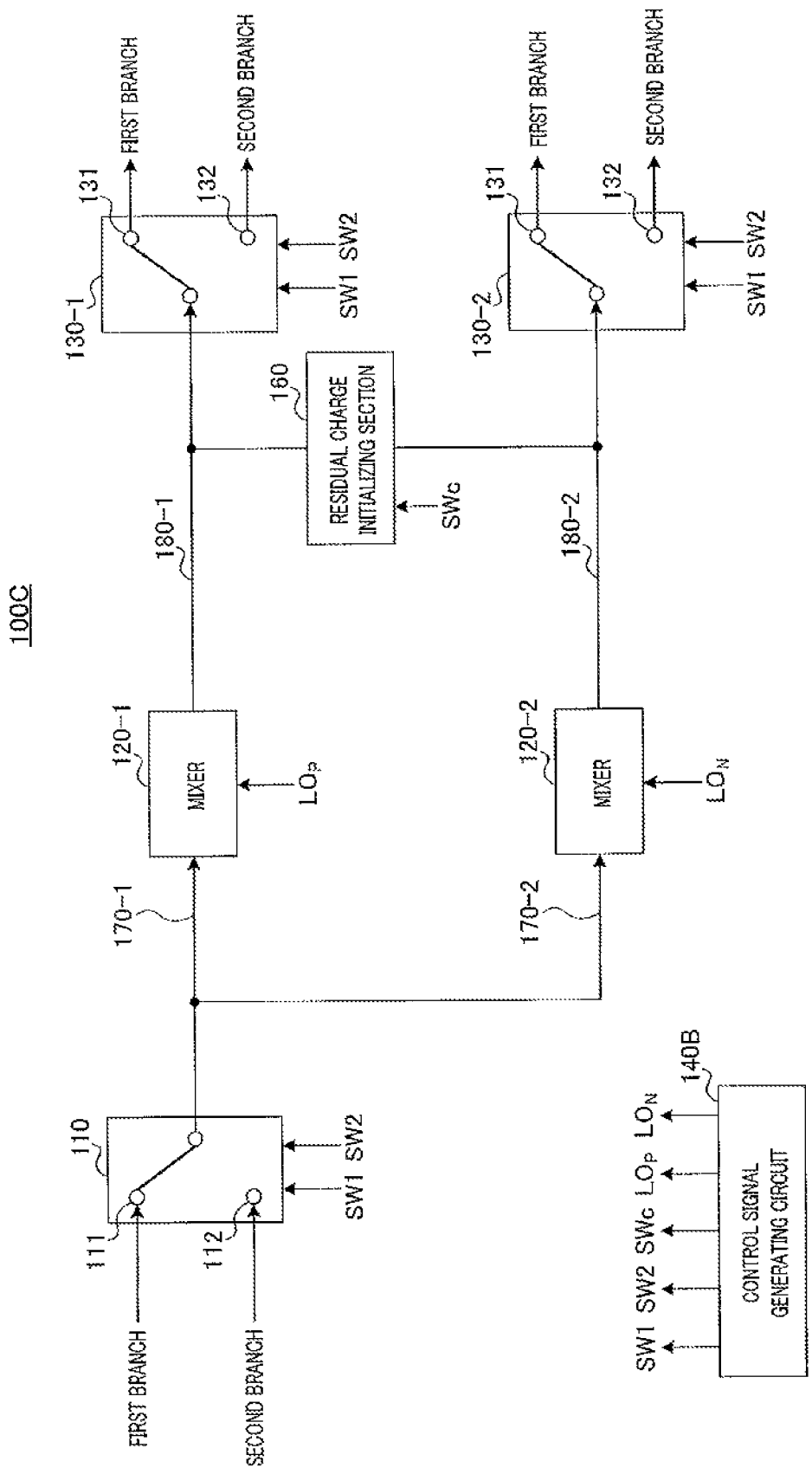
FIG. 11 is a block diagram illustrating still another configuration of a time-division receiver according to embodiment 1.

FIG. 11 is a block diagram illustrating still another configuration of a time-division receiver according to the present embodiment. In FIG. 11, components that are the same as those in FIG. 3 are provided with reference numerals that are the same as those in FIG. 3 and a description, thereof will be omitted. Time-division receiver 100C in FIG. 11 employs a configuration of time-division receiver 100A in FIG. 3 with control signal generating circuit 140B provided instead of control signal generating circuit 140A and with reversed-phase signal generating section 150 removed.

As with control signal generating circuit 140A, control signal generating circuit 140B generates control signals SW1 SW2 and SWc and local signal $LO_P$. Furthermore, control signal generating circuit 140B generates local signal $LO_N$ obtained by reversing a phase of local signal $LO_p$ and supplies local signal $LO_N$ to mixer 120-2. Consequently, a reversed-phase baseband signal is output from mixer 120-2.

Figure 12:
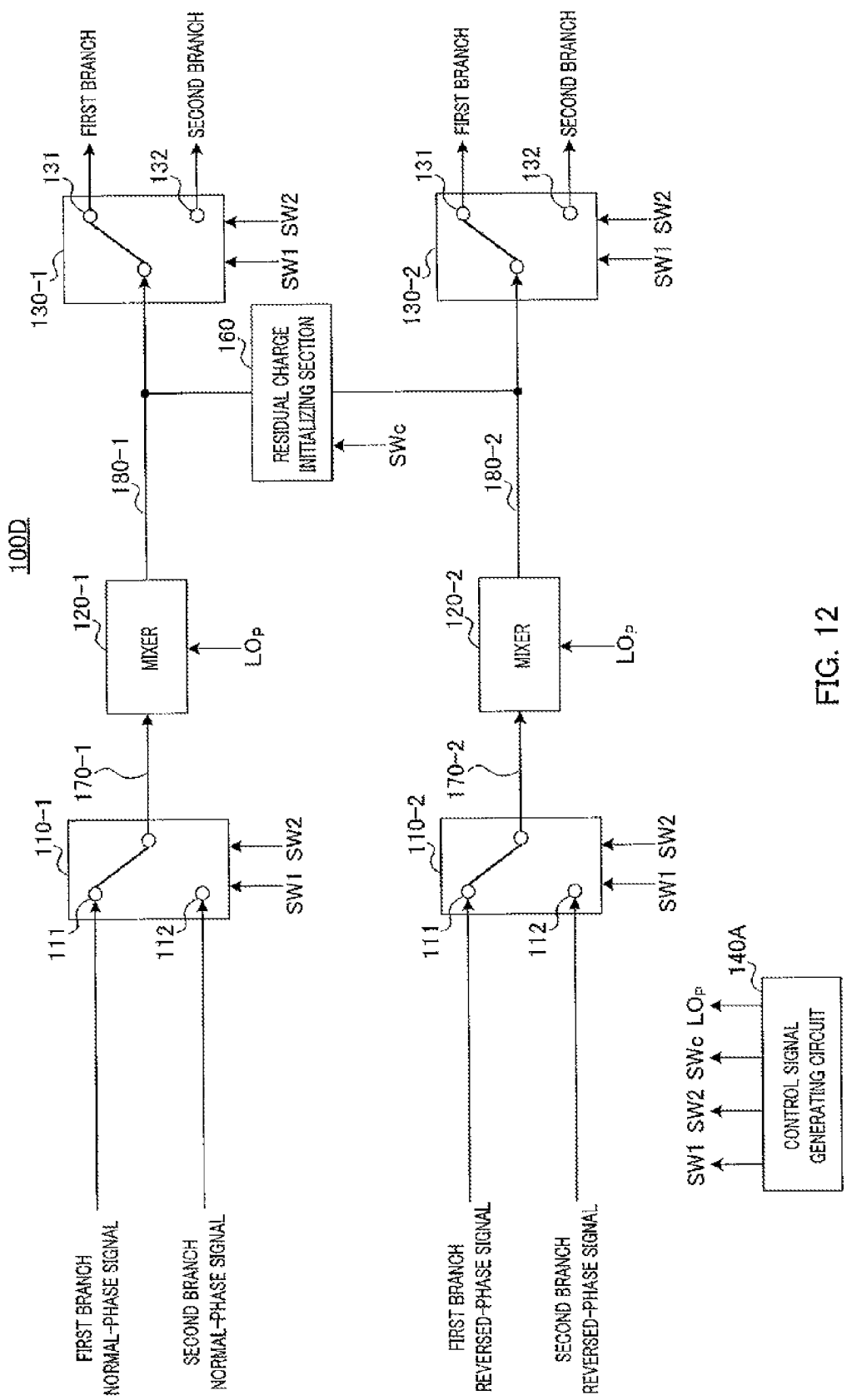
FIG. 12 is a block diagram illustrating still another configuration of a time-division receiver according to embodiment 1.

FIG. 12 is a block diagram illustrating still another configuration of a time-division receiver according to the present embodiment. In FIG. 12, components that are the same as those in FIG. 10 are provided with reference numerals that are the same as those in FIG. 10 and a description thereof will be omitted. Time-division receiver 100D in FIG. 12 employs a configuration of time-division receiver 100B in FIG. 10 with reversed-phase signal generating sections 150-1 and 150-2 removed. Time-division receiver 100D in FIG. 12 provides an example configuration where normal-phase signals for first and second branches and reversed-phase signals for the first and second branches are input, respectively.

Figure 13:
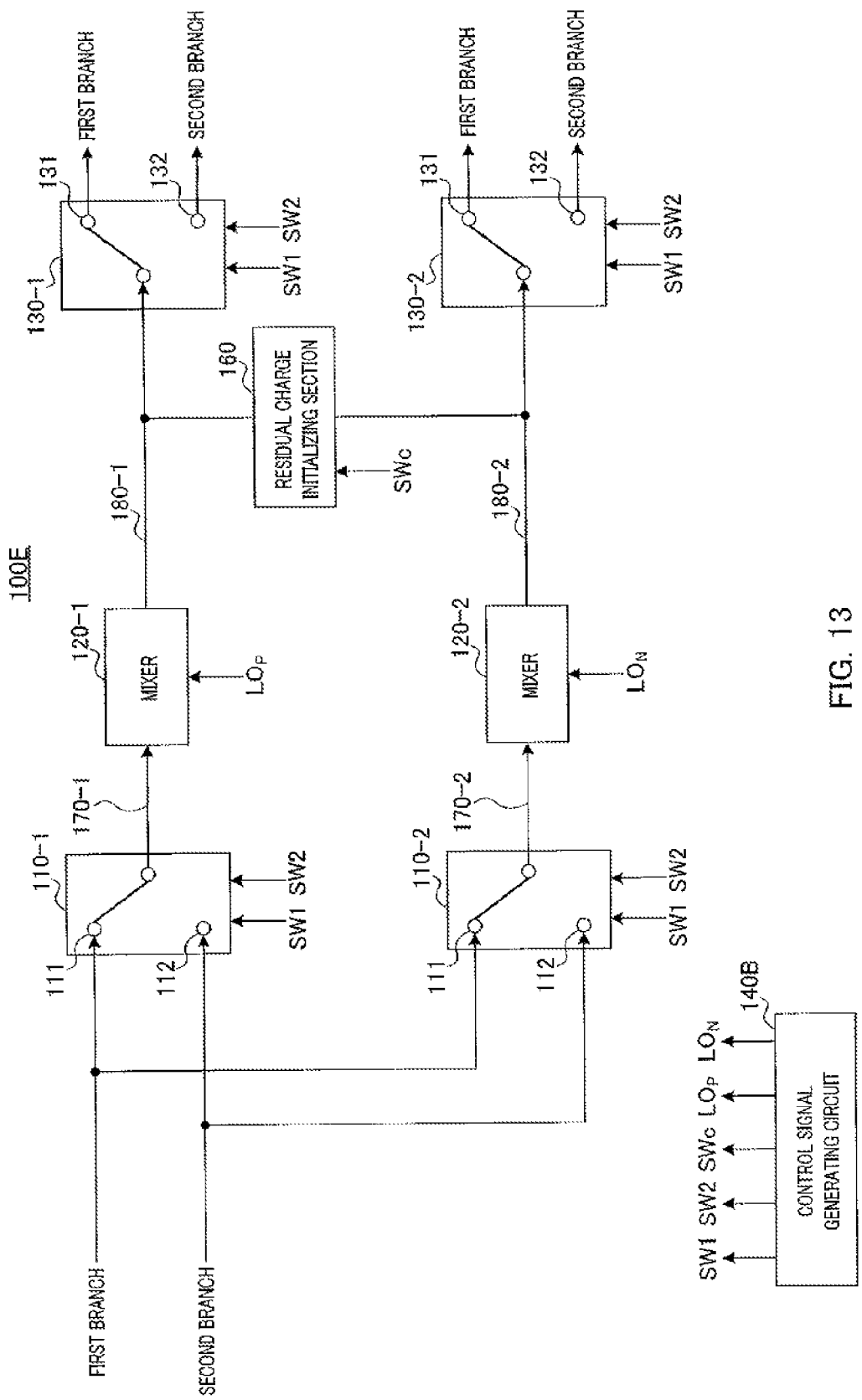
FIG. 13 is a block diagram illustrating still another configuration of a time-division receiver according to embodiment 1.

FIG. 13 is a block diagram illustrating still another configuration of a time-division receiver according to the present embodiment. In FIG. 13, components that are the same as those in FIG. 10 are provided with reference numerals that are the same as those in FIG. 10 and a description thereof will be omitted. Time-division receiver 100E in FIG. 13 employs a configuration of time-division receiver 100B in FIG. 10 with control signal generating circuit 140B provided instead of control signal generating circuit 140A and with reversed-phase signal generating sections 150-1 and 150-2 removed. In time-division receiver 100E in FIG. 13, control signal generating circuit 140B supplies local signal $LO_N$ obtained by reversing a phase of local signal $LO_p$ to mixer 120-2. Consequently, a reversed-phase baseband signal is output from mixer 120-2.

The present embodiment has been described in terms of a case where the present invention is applied to time-division receiver 100 in which a time-division shared radio-frequency circuit includes a mixer. However, the configuration of time-division receiver 100 to which the present invention can be applied is not limited to this case. Any types of receivers other than time-division receiver 100 can provide an effect similar to that of time-division receiver 100 by providing residual charge initializing section 160 in the receiver. Such receivers will be described 111 embodiment 3 onwards.

Embodiment 2

Figure 14:
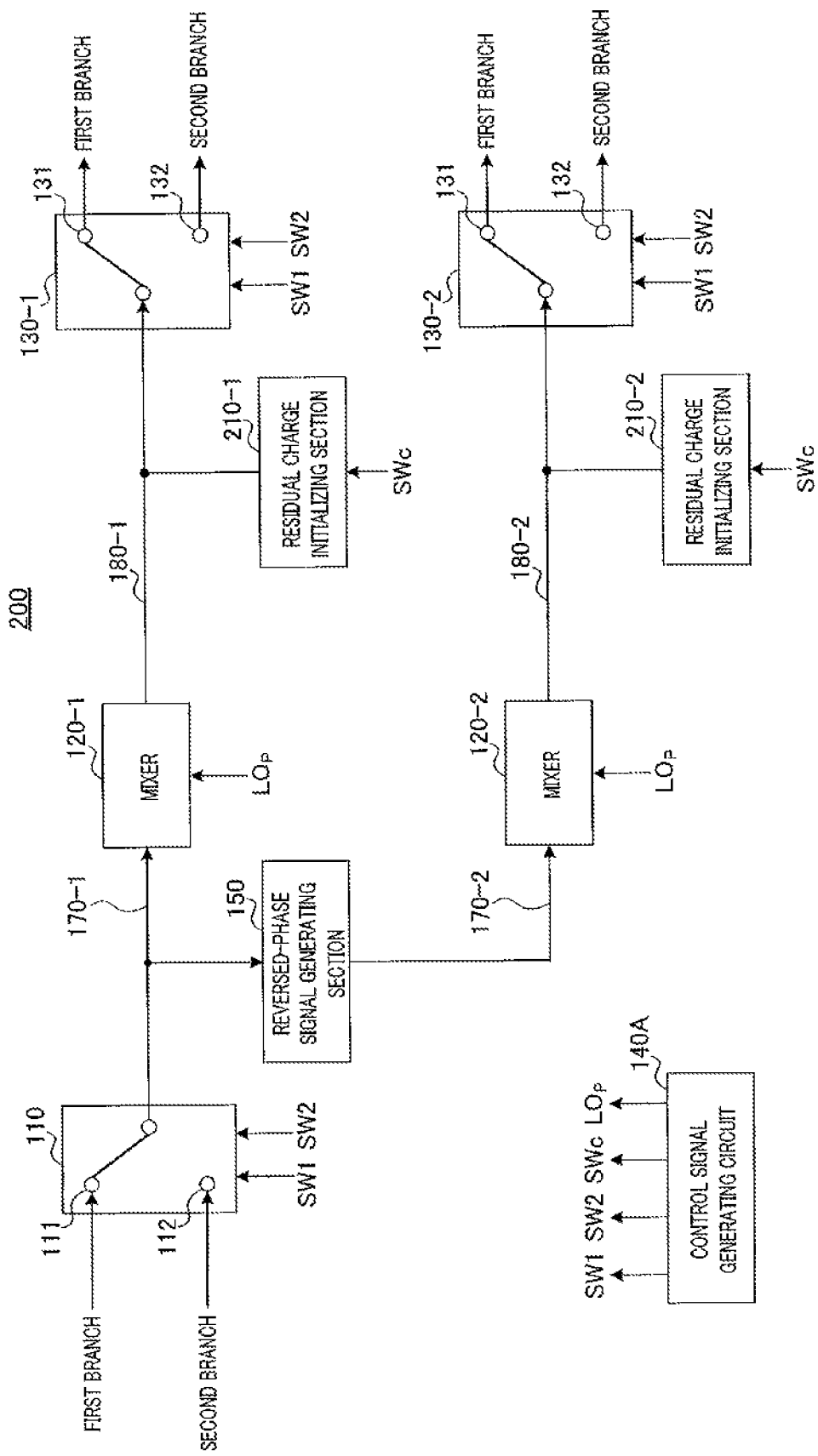
FIG. 14 is a block diagram illustrating a configuration of a time-division receiver according to embodiment 2 of the present invention.

FIG. 14 is a block diagram illustrating a configuration of a time-division receiver according to an embodiment of the present invention in FIG. 14, components that are the same as those FIG. 3 are provided with reference numerals that are the same as those in FIG. 3 and a description thereof will be omitted. Time-division receiver 200 in FIG. 14 includes residual charge initializing sections 210-1 and 210-2 instead of residual charge initializing section 160 in time-division receiver 100A in FIG. 3.

Figure 15:
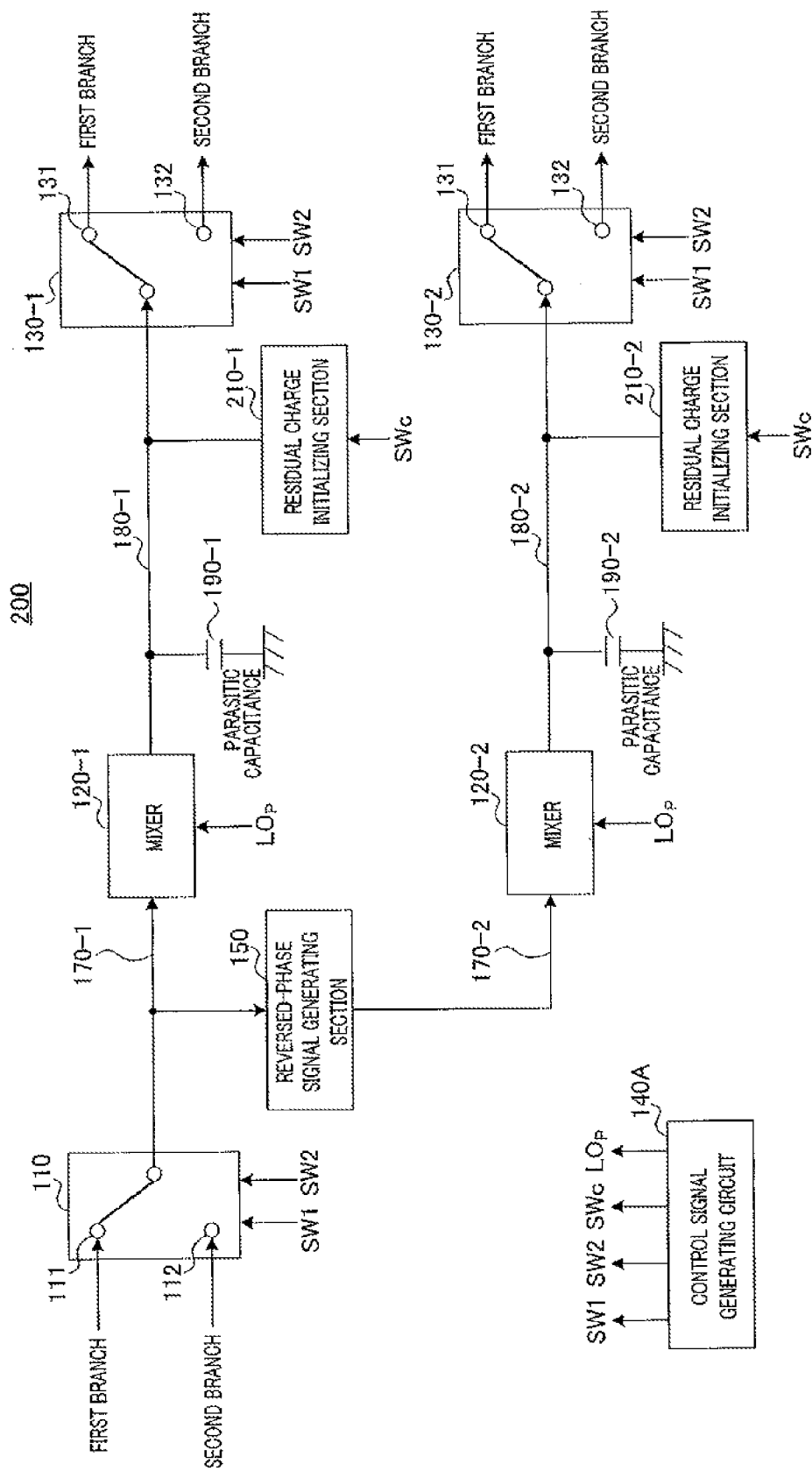
FIG. 15 is a diagram conceptually illustrating parasitic capacitances generated on time-division shared signal lines.

FIG. 15 is a diagram conceptually illustrating parasitic capacitances generated on time-division shared signal lines 180-1 and 180-2. In FIG. 15, parasitic capacitances 190-1 and 190-2 are parasitic capacitances generated on time-division shared signal lines 180-1 and 180-2. In parasitic capacitances 190-1 and 190-2, signal components before branch switching remain.

Figure 16:
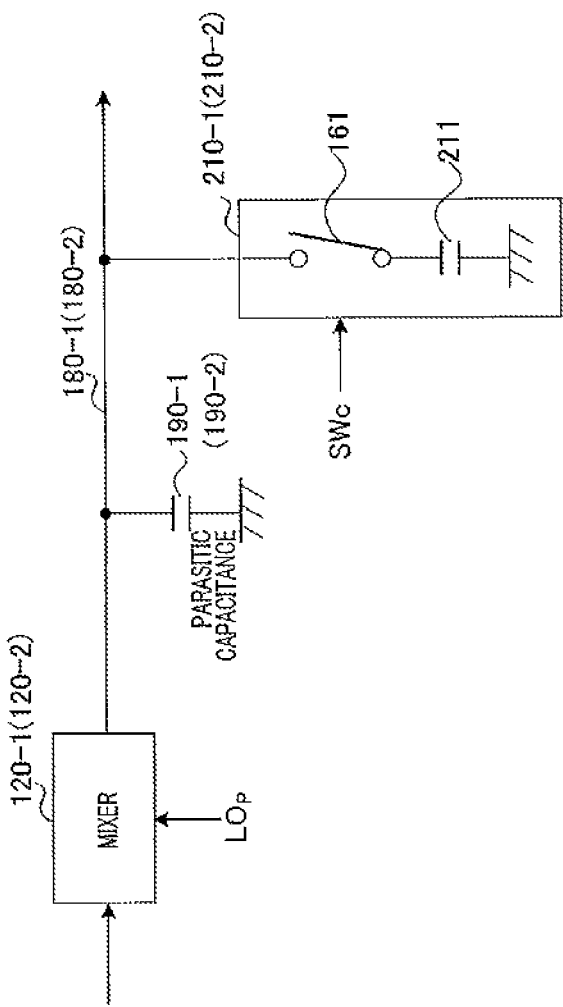
FIG. 16 is a diagram illustrating an internal configuration of a residual charge initializing section according to embodiment 2.

FIG. 16 is a diagram illustrating an internal configuration of residual charge initializing section 210-1 (210-2) according to the present embodiment and connection to the same. Residual charge initializing section 210-1 (210-2) according to the present embodiment includes charge supply section (voltage source) 211 and switch 161.

As in embodiment 1, switch 161 is on during a period in which SWc is active, whereby a normal-phase (reversed-phase) circuit and charge supply section 211 are in a conducting state. Also, as in embodiment 1, switch 161 is off during a period in which SWc is non-active, whereby the normal-phase (reversed-phase) circuit and charge supply section 211 are in a non-conducting state.

In a conducting state, charge supply section 211 supplies charge to parasitic capacitance 190-1 (190-2) to bring the charge in parasitic capacitance 190-1 (190-2) to a reference charge level. As described above, residual charge initializing section 210-1 (210-2) initializes the charge accumulated, in parasitic capacitance 190-1 (190-2).

As described above, residual charge initializing section 210-1 (210-2) includes charge supply section 211 and switch 161. Switch 161 controls connection/disconnection between charge supply section 211 and an output path for mixer 120-1 (120-2) for every branch switching. More specifically, switch 161 connects charge supply section 211 and the output path for mixer 120-1 (120-2) in a period in which SWc is active, that is, quiescent period. Then, in a conducting state, charge supply section 211 supplies charge to parasitic capacitance 190-1 (190-2). As described above, residual charge initializing section 210-1 (210-2) initializes a charge remaining in a parasitic capacitance, which is generated on the output path, when a first branch signal has passed through the path, before a second branch signal passes through the path. Consequently, time-division receiver 200 can reduce leakage between the branches.

Furthermore, in the case where charge supply section 211 is a voltage source that can stably supply charge, time-division receiver 200 can mitigate leakage between the branches with higher precision compared to time-division receivers 100A and 100B according to embodiment 1.

Furthermore, the present embodiment can be applied to non-differential systems as well as differential systems. However, in the case where charge supply section 211 that can stably supply charge is provided, the present embodiment can provide higher performance in mitigating leakage between the branches compared to embodiment 1, but causes a large circuit impact.

Embodiment 3

Embodiments 1 and 2 have been described in terms of a case where the present invention is applied to a time-division receiver in which a radio-frequency circuit includes a mixer. The present embodiment will be described in terms of a case where the present invention is applied to a time-division receiver in which a radio-frequency circuit includes a DSM.

Figure 17:
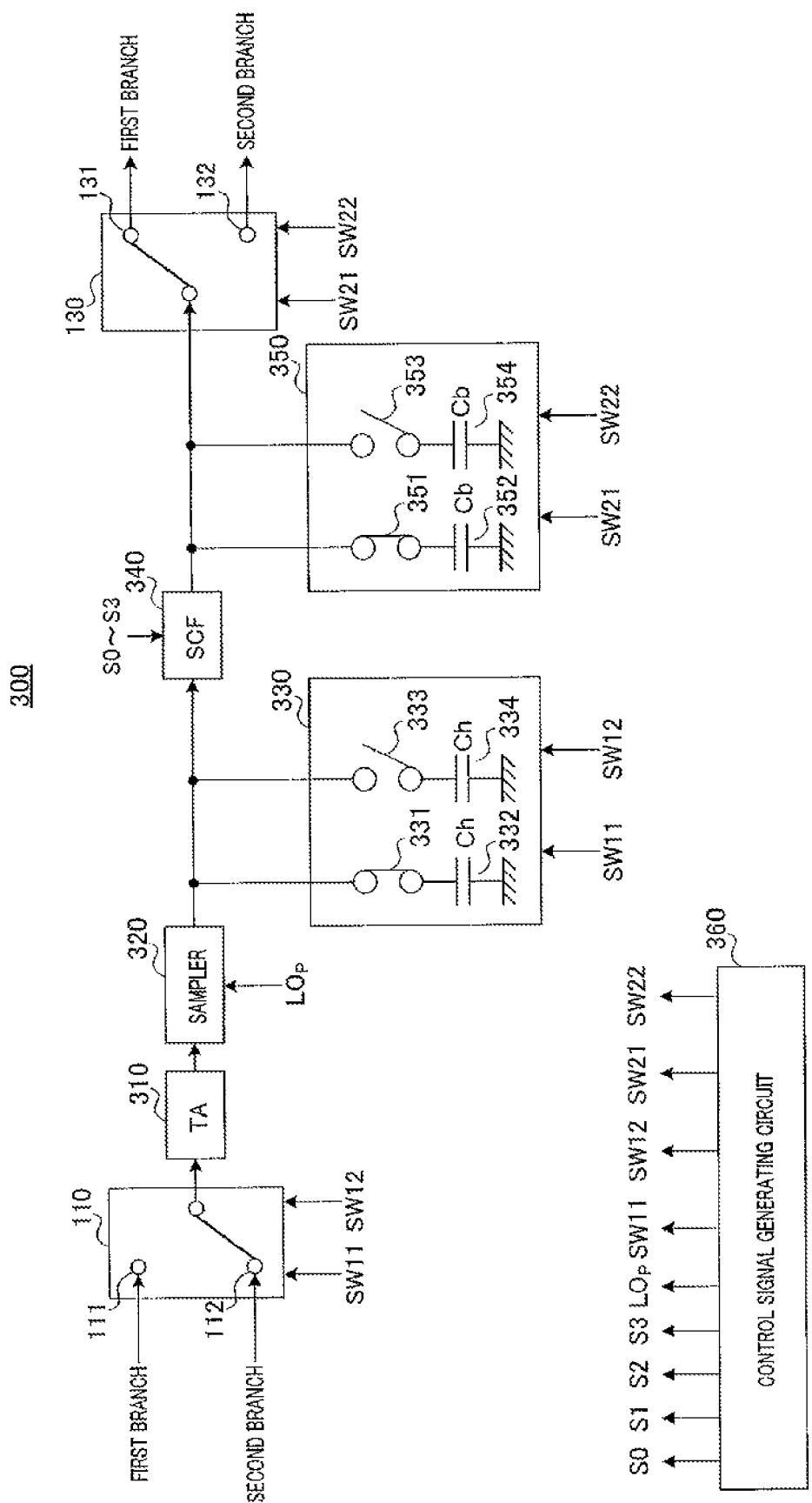
FIG. 17 is a block diagram illustrating a configuration of a time-division receiver to which the present invention is applied.

FIG. 17 is a block diagram illustrating a configuration of a time-division receiver to which the present invention is applied. In FIG. 17, components that are the same as those in FIG. 1 are provided with reference numerals that are the same as those in FIG. 1 and a description thereof will be omitted. Time-division receiver 300 in FIG. 17 is a time-division receiver in which a radio-frequency circuit includes a DSM.

In FIG. 17, time-division receiver 300 includes time-division multiplexing section 110, time-division demultiplexing section 130, TA (transconductance amplifier: voltage-current converter) 310, sampler 320, history capacitor section 330, SCF (switched capacity filter) 340, buffer capacitor section 351) and control signal generating circuit 360.

Control signal generating circuit 360 supplies control signals to time division multiplexing section 110, time-division demultiplexing section 130, history capacitor section 330, SCF 340 and buffer capacitor section 350.

Figure 18:
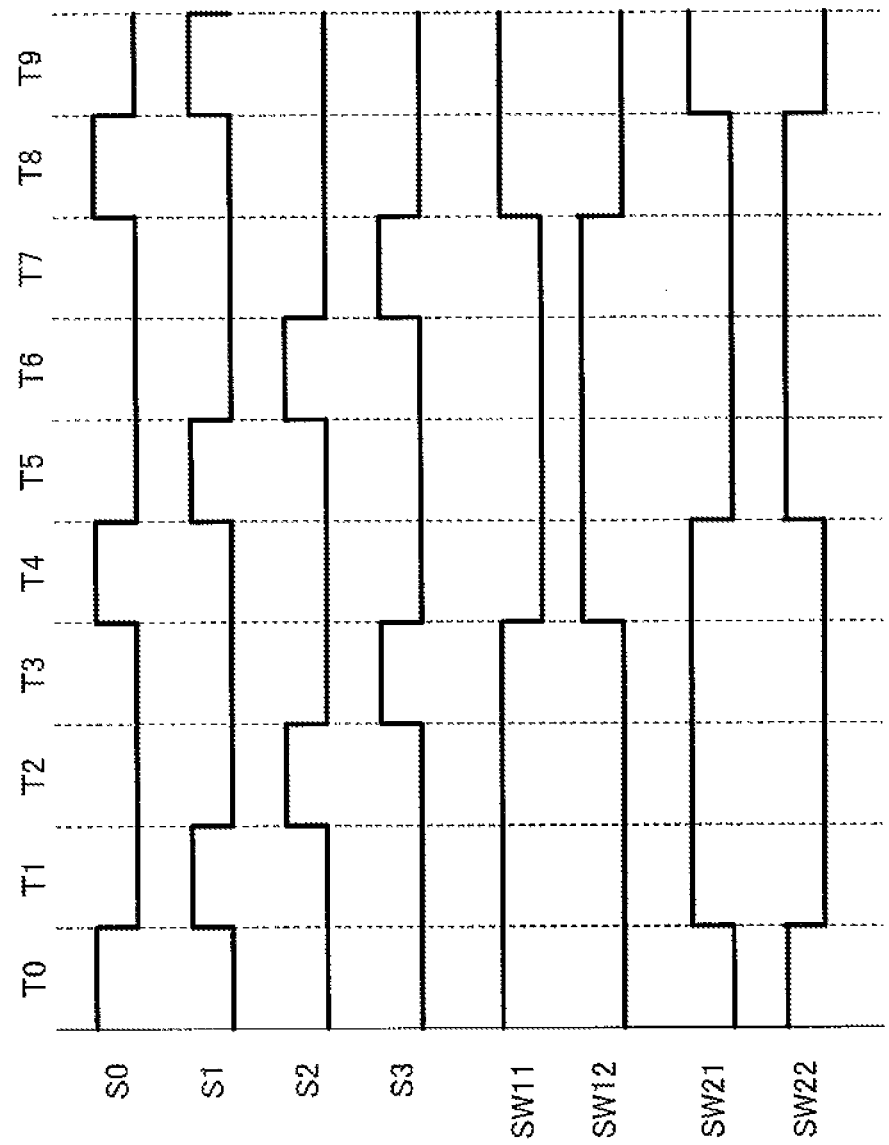
FIG. 18 is a diagram illustrating control signals supplied from a control signal generating circuit.

More specifically, control signal generating circuit 360 generates control signals SW11, SW12, SW21, SW22 and S0 to S3. Then, control signal generating circuit 360 supplies SW11 and SW12 to time division multiplexing section 110 and history capacitor section 330. Control signal generating circuit 360 also supplies SW21 and SW22 to buffet capacitor section 350 and time-division demultiplexing section 130. Control signal generating circuit 360 also supplies S0 to S3 to SCF 340. FIG. 18 is a diagram illustrating control signals SW1, SW12, SW21, SW22 and S0 to S3 supplied from control signal generating circuit 360. Details of the control signals will be described later.

Control signal generating circuit 360 also generates local signal $LO_p$. Then, control signal generating circuit 360 supplies local signal $LO_p$ to sampler 320.

TA 310 coverts a time-division multiplexed signal from a voltage signal to a current signal, and outputs the time-division multiplexed signal to sampler 320 as an analog RF current signal.

Sampler 320, which includes, for example, an FET (field-effect transistor), samples the analog RE current signal using local signal $LO_p$ to perform frequency conversion (down-conversion).

The signal output from TA 310 and sampler 320 is a current signal, and the current signal is output to time-division demultiplexing section 130. The subsequent processing is also performed on the current signal.

History capacitor section 330 includes switches 331 and 333 and Chs (history capacitors) 332 and 334.

Switches 331 and 333 are turned on/off in response to SW11 and SW12. More specifically, switch 331 is on during a period in which SW11 is active and is off during a period in which SW11 is non-active. Switch 333 is on during a period in which SW12 is active, and is off during a period in which SW12 is non-active.

Ch 332 is a history capacitor for a first branch, and Ch 334 is a history capacitor for a second branch.

As described above, on an output path for sampler 320, Ch 332 for the first branch and Ch 334 for the second branch are provided. Connection/disconnection between these capacitors and the output path for sampler 320 are controlled by switches 331 and 333.

SCF 340 repeats charging and discharging of later-described rotation capacitors in response to S0 to S3 to filter the current signal output from sampler 320, and outputs the filtered signal to time-division demultiplexing section 130. A detailed configuration of SCF 340 will be described later.

Buffer capacitor section 350 includes switches 351 and 353 and Cbs (buffer capacitors) 352 and 354.

Switches 351 and 353 are turned on/off in response to SW21 and SW22, respectively. More specifically, switch 351 is on during a period in which SW21 is active, and is off during a period in which SW21 is non-active. Switch 353 is on during a period in which SW22 is active and is off during a period in which SW22 is non-active.

Cb 352 is a buffer capacitor for the first branch and Cb 354 is a buffer capacitor for the second branch.

As described above, on the output path for SCF 340, Cb 352 for the first branch and Cb 354 for the second branch are provided. Connection/disconnection between these capacitors and the output path for SCF 340 is controlled by switches 351 and 353.

Figure 19:
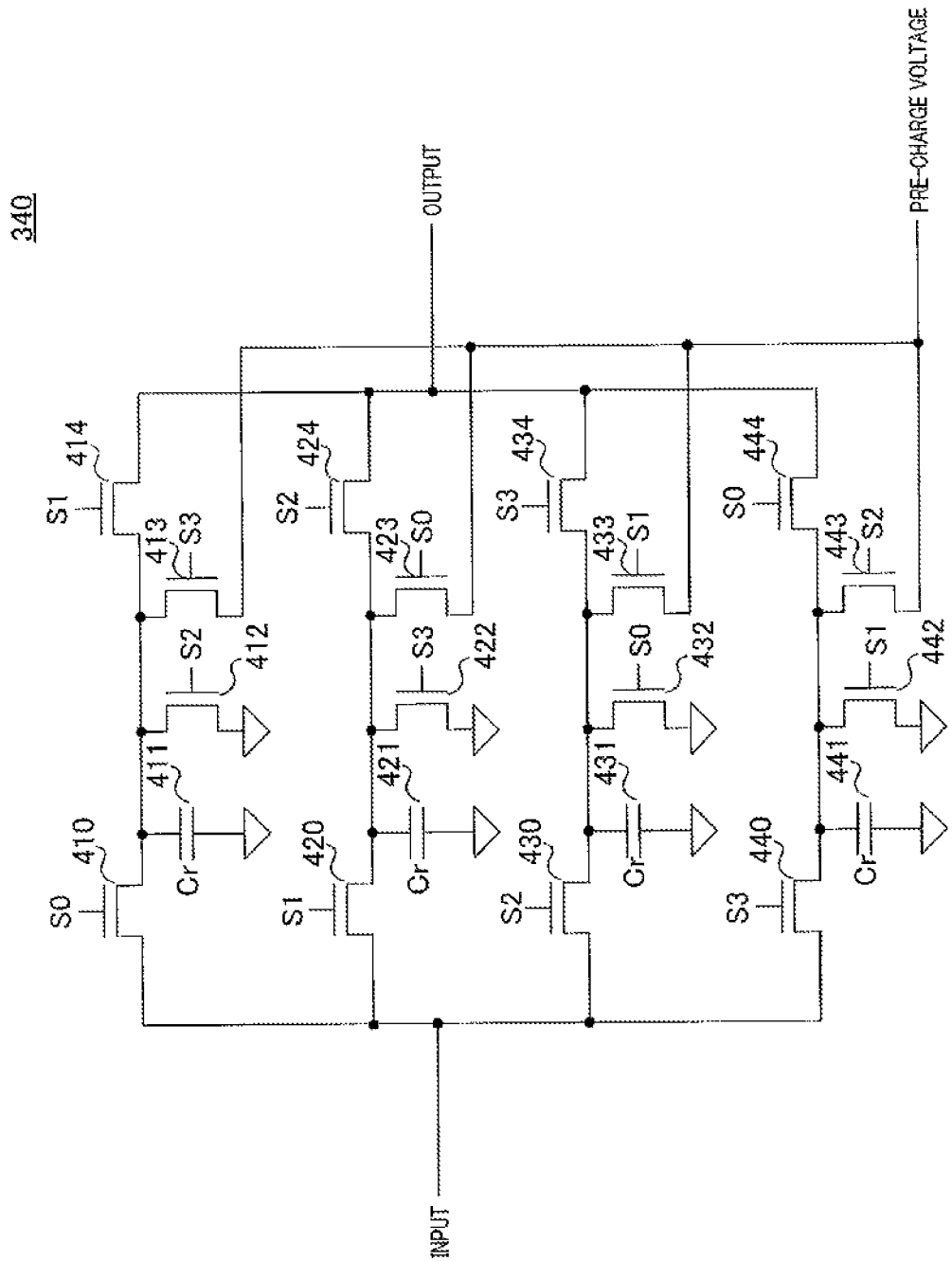
FIG. 19 is a diagram illustrating an internal configuration of an SCF.

FIG. 19 is a diagram illustrating an example detailed configuration inside SCF 340 in FIG. 17.

As illustrated in FIG. 19, four paths are provided between an input and an output of SCF 340. Path 1 includes switches 410, 412, 413 and 414, and Cr (rotation capacitor) 411. Path 2 includes switches 420, 422, 423 and 424, and Cr 421. Path 3 includes switches 430, 432, 433 and 434, and Cr 431. Path 4 includes switches 440, 442, 443 and 444, and Cr 441. Here, switches 410, 420, 430 and 440 are switches for input control. Switches 412, 422, 432 and 442 are switches for discharge. Switches 413, 423, 433 and 443 are switches for pre-charge voltage supply. Switches 414, 424, 434 and 444 are switches for output control.

As described above, SCF 340 includes configurations of the four paths, which are completely similar to one another. The respective switches are controlled by S0 to S3 supplied from control signal generating circuit 360.

Next, an operation of SCF 340 will be described. Each of the four paths in SCF 340 cycles through four states. Since similar processing is performed for the respective paths, description will be provided for path 1.

In a first state, switch 412 is turned on, whereby Cr 411 is discharged.

Next, in a second state, switch 413 is turned on, whereby a pre-charge voltage is supplied to Cr 411 as an initial charge.

Next, in a third state, switch 410 is turned on, whereby an input signal is loaded, the charge is shared by Cr 411 and history capacitor section 330 in the preceding stage of SCF 340.

Lastly, in a fourth state, switch 414 is turned on whereby the charge is shared between Cr 411 and buffer capacitor section 350 in the following stage of SCF 340.

For operations in the other paths, processing for the four states is performed in each of the remaining three paths with the state shifted by one state from one another. Then, in the present embodiment, charges are shared by the Chs in history capacitor section 330 and the Crs in SCF 340, and furthermore charges are shared by the Crs in SCF 340 and the Cbs in buffer capacitor section 350. Consequently, SCF 340 serves as a second-order IIR (Infinite Impulse Response) filter.

Here, in FIG. 18, SW11 and SW12 are control signals supplied to time-division multiplexing section 110, and switches 331 and 333 in history capacitor section 330. SW21 and SW22 are control signals supplied to time-division demultiplexing section 130, and switches 351 and 353 in buffer capacitor section 350.

During a period in which SW11 and SW21 are active, the first branch is selected, and during a period in which SW12 and SW22 are active, the second branch is selected. Here, SW21 and SW22 are delayed by one time period relative to SW11 and SW12 because an input signal is delayed by one time period in SCF 340.

A configuration of time-division receiver 300 to which the present invention is applied has been described above. In time-division receiver 300, a parasitic capacitance is generated on each of an output path for sampler 320 (input path for SCF 340) and the output path for SCF 340. Therefore, in time-division receiver 300, leakage between the branches occurs due to an influence of charges (residual charges) generated as a result of signal components before branch switching remaining in the parasitic capacitances. Therefore, the present embodiment will be described in terms of a time-division receiver that, where a radio-frequency circuit includes a DSM, can reduce leakage between branches.

Figure 20:
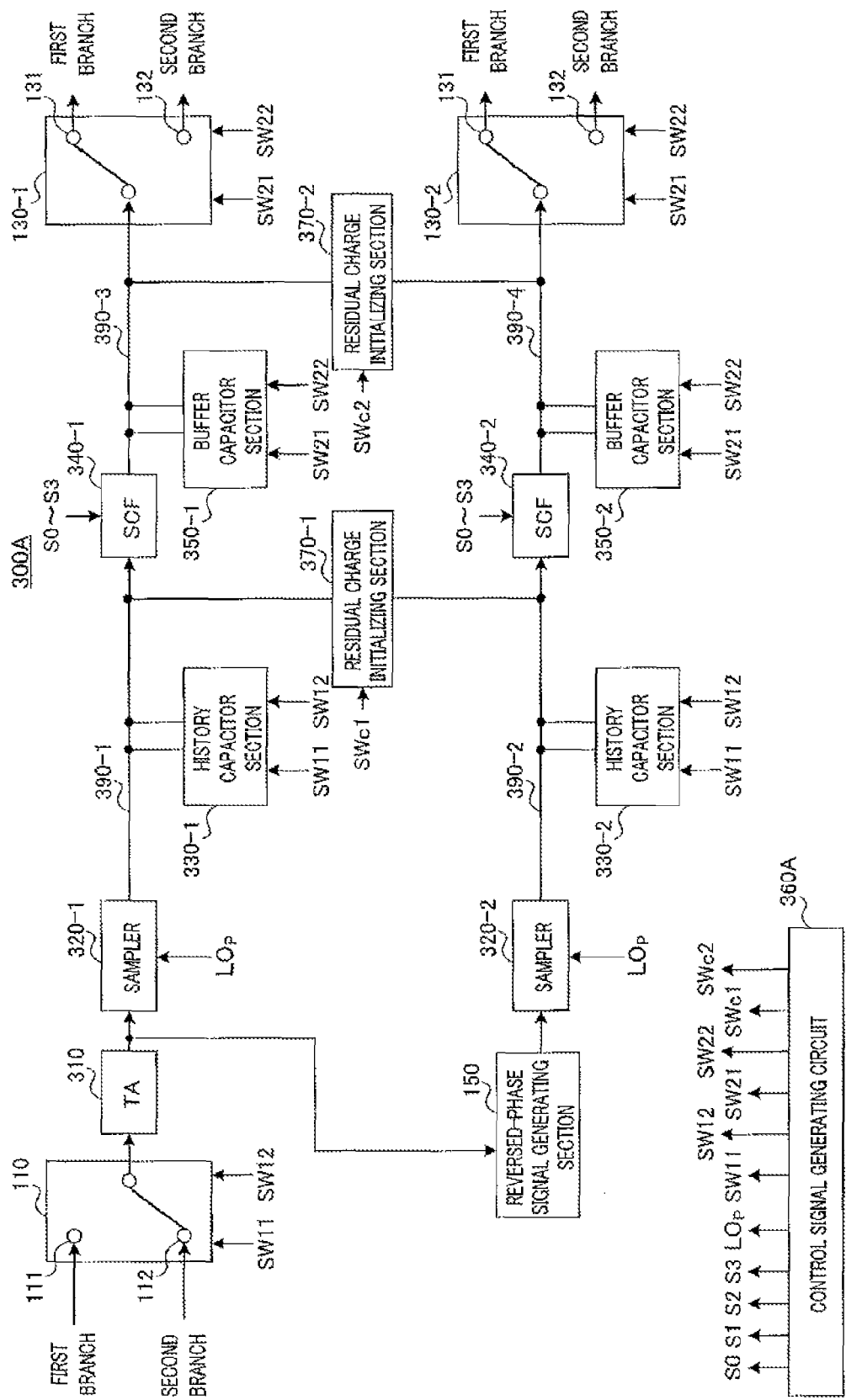
FIG. 20 is a block diagram illustrating a configuration of a time-division receiver according to embodiment 3 of the present invention.

FIG. 20 is a block diagram illustrating a configuration of a time-division receiver 300A according to the present embodiment. In FIG. 20, components that are the same as those in FIG. 17 are provided with reference numerals that are the same as those in FIG. 17 and a description thereof will be omitted.

In FIG. 20, time-division receiver 300A includes time-division multiplexing section 110, TA 310, samplers 320-1 and 320-2, reversed-phase signal generating section 150, history capacitor sections 330-1 and 330-2, SCFs 340-1 and 340-2, buffer capacitor sections 350-1 and 350-2, residual charge initializing sections 370-1 and 370-2, control signal generating circuit 360A, and time-division demultiplexing sections 130-1 and 130-2.

In FIG. 20, sampler 320-1, history capacitor section 330-1, SCF 340-1 and buffer capacitor section 350-1 process a normal-phase signal in a differential system. Also, sampler 320-2, history capacitor section 330-2, SCF 340-2 and buffer capacitor section 350-2 process a reversed-phase signal in the differential system. Hereinafter processing sections that process a normal-phase signal are collectively referred to as a normal-phase circuit, and processing sections that process a reversed-phase signal are collectively referred to as a reversed-phase circuit.

In FIG. 20, a path between sampler 320-1 and SCF 340-1 (input path for SCF 340-1) is referred to as time-division shared signal line 390-1. A path between sampler 320-2 and SCF 340-2 (input path for SCF 340-2) is referred to as time-division shared signal line 390-2. A path between SCF 340-1 and time-division demultiplexing section 130-1 (output path for SCF 340-1) is referred to as time-division shared signal line 390-3. A path between SCF 340-2 and time-division demultiplexing section 130-2 (output path for SCF 340-2) is referred to as time-division shared signal line 390-4. A parasitic capacitance is generated on each of time-division shared signal lines 390-1, 390-2, 390-3 and 390-4.

Control signal generating circuit 360A supplies control signals to time-division multiplexing section 110, time-division demultiplexing sections 130-1 and 130-2, history capacitor sections 330- and 330-2, SCFs 340-1 and 340-2, buffer capacitor sections 350-1 and 350-2 and residual charge initializing sections 370-1 and 370-2.

Figure 21:
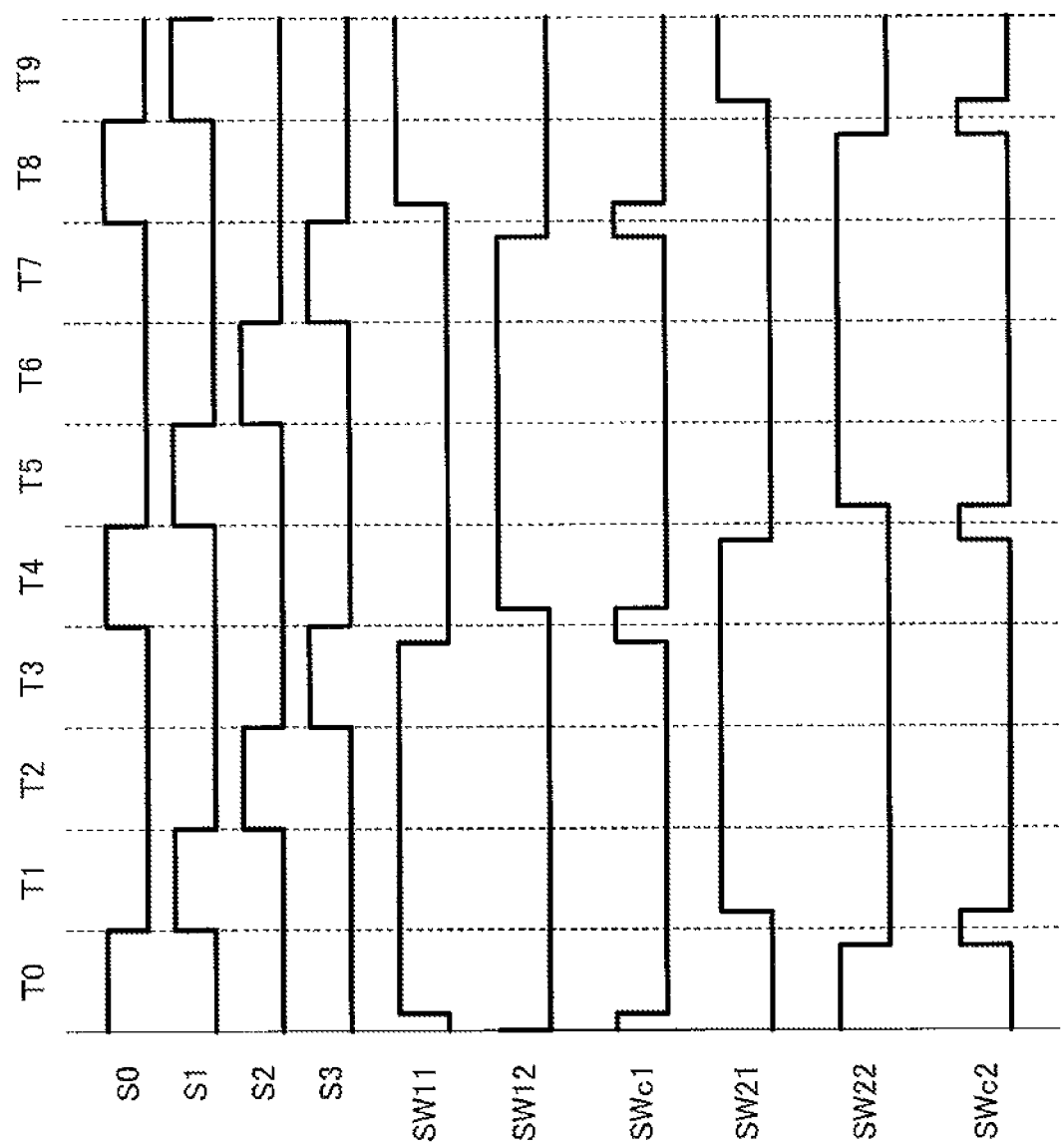
FIG. 21 is a diagram illustrating control signals supplied from a control signal generating circuit.

More specifically, control signal generating circuit 360A generates SW11, SW12, SW21, SW22, SWc1, SWc2 and S0 to S3. Then, control signal generating circuit 360A supplies SW11 and SW12 to time-division multiplexing section 110 and history capacitor sections 330-1 and 330-2. Control signal generating circuit 360A also supplies SW21 and SW22 to buffer capacitor sections 350-1 and 350-2 and time-division demultiplexing sections 130-1 and 130-2. Control signal generating circuit 360A also supplies SWc1 to residual charge initializing section 370-1. Control signal generating circuit 360A also supplies SWc2 to residual charge initializing section 370-2. Control signal generating circuit 360A also supplies S0 to S3 to SCFs 340-1 and 340-2. FIG. 21 is a diagram illustrating control signals SW11, SW12, SW21, SW22, SWc1, SWc2 and S0 to S3 supplied from control signal generating circuit 360A. Details of the control signals will be described later.

Control signal generating circuit 360A also generates local signal $LO_p$. Then, control signal generating circuit 360A supplies local signal $LO_p$ to samplers 320-1 and 320-2.

Reversed-phase signal generating section 150 reverses a phase of a current signal output from TA 310 to generate a reversed-phase time-division multiplexed signal and outputs the reversed-phase time-division multiplexed signal to sampler 320-2.

As with sampler 320, samplers 320-1 and 320-2 sample the analog RF current signal using local signal $LO_p$ to perform frequency conversion (down-con version).

As with history capacitor section 330, each of history capacitor sections 330-1 and 330-2 includes switches 331 and 333, and Chs 332 and 334. Switches 331 and 333 switch connection/disconnection between respective output paths for sampler 320-1 and 320-2 and respective Chs 332 for a first branch or respective Chs 334 for a second branch in response to SW11 and SW12.

SCFs 340-1 and 340-2 each employs a configuration similar to that of SCF 340. SCF 340-1 repeats charging/discharging of rotation capacitors in response to S0 to S3 to filter the normal-phase current signal, and outputs the filtered signal to time-division demultiplexing section 130-1. Also, SCF 340-2 repeats charging/discharging of rotation capacitors in response to S0 to S3 to filter the reversed-phase current signal, and outputs the filtered signal to time-division demultiplexing section 130-2.

As with buffer capacitor section 350, each of buffer capacitor sections 350-1 and 350-2 includes switches 351 and 353, and Cbs 352 and 354. Switches 351 and 353 switch connection/disconnection between respective output paths for SCFs 340-1 and 340-2 and Cb 352 for the first branch or Cb 354 for the second branch in response to SW21 and SW22.

As with time-division demultiplexing section 130, each of time-division demultiplexing sections 130-1 and 130-2 demultiplexes a baseband time-division multiplexed signal (baseband signal) into the first and second branches in response to SW21 and SW22. More specifically, time-division demultiplexing sections 130-1 and 130-2 output the respective baseband signals to respective output terminals 131 during period in which SW21 is active. Also, time-division demultiplexing sections 130-1 and 130-2 output the respective baseband signals to respective output terminals 132 during a period in which SW22 is active.

Residual charge initializing sections 370-1 and 370-2 initialize charges remaining in parasitic capacitances in time-division receiver 300A.

Figure 22:
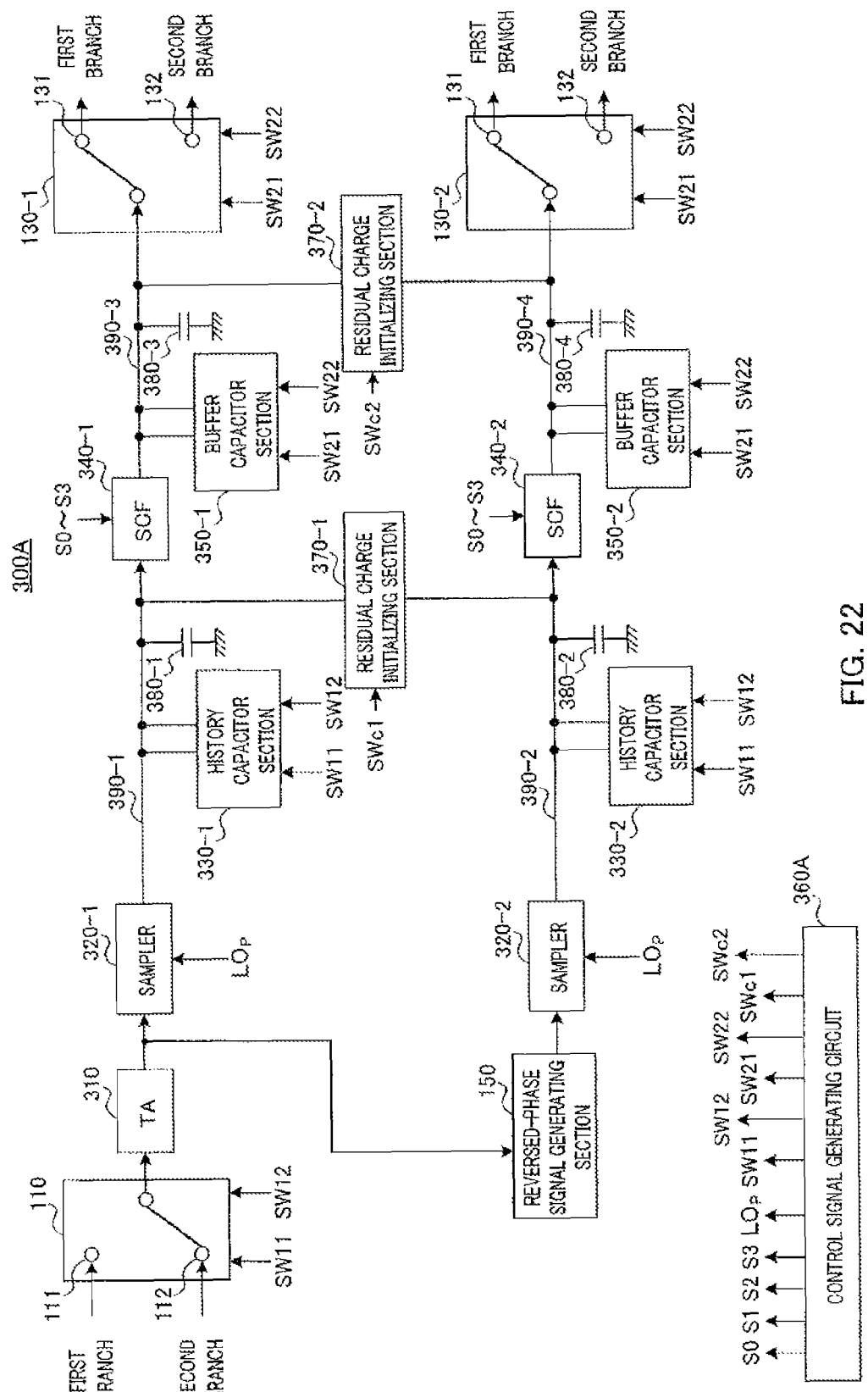
FIG. 22 is a diagram conceptually illustrating parasitic capacitances generated on time-division shared signal lines.

FIG. 22 is a diagram conceptually illustrating parasitic capacitances generated in time-division receiver 300A. In FIG. 22, parasitic capacitances 380-1, 380-2, 380-3 and 380-4 are parasitic, capacitances generated in time-division receiver 300A. Signal components before branch switching remain in parasitic capacitances 380-1, 380-2, 380-3 and 380-4.

Therefore, in time-division receive 300A according to the present embodiment, residual charge initializing sections 370-1 and 370-2 are provided in the preceding and following stages of SCFs 340-1 and 340-2, respectively. Here, an internal configuration of residual charge initializing sections 370-1 and 370-2 is similar to that of residual charge initializing section 160, and thus, illustration and description thereof will be omitted.

In other words, in the present embodiment, residual charge initializing section 370-1 makes charges accumulated in parasitic capacitances 380-1 and 380-2 generated in the preceding stage of SCFs 340-1 and 340-2 (residual charges) be initialized (cancelled out). Also, residual charge initializing section 370-2 makes charges accumulated in parasitic capacitances 380-3 and 380-4 generated in the following stage of SCFs 340-1 and 340-2 (residual charges) be initialized (cancelled out).

Next, control signals output from control signal generating circuit 360A will be described with reference to FIG. 21.

In FIG. 21, SW11 and SW12 are control signals supplied to time-division multiplexing section 110, and switches 331 and 333 in history capacitor sections 330-1 and 330-2. SW21 and SW22 are control signals supplied to time-division demultiplexing sections 130-1 and 130-2, and switches 351 and 353 in buffer capacitor sections 350-1 and 350-2. SWc1 and SWc2 are control signals for controlling respective switches 161 in residual charge initializing sections 370-1 and 370-2. During a period in which SWc1 and SWc2 are active, switches 161 in residual charge initializing sections 370-1 and 370-2 are on, whereby a normal-phase circuit and a reversed-phase circuit are in a conducting state (interdifferential short-circuiting). As a result, charges accumulated in the parasitic capacitances in the normal-phase circuit and the reversed-phase circuit (residual charges) are cancelled out, whereby the residual charges are initialized.

Here, control signals used in the present embodiment (see FIG. 21) and control signals in FIG. 18 are different from each other in the following points. In the control signals in FIG. 21, a non-active period is provided between an SW11 active period and an SW12 active period, and between an SW21 active period and an SW22 active period. Meanwhile, in the control signals in FIG. 18, there is no non-active period between an SW11 active period and an SW12 active period, and between an SW21 active period and an SW22 active period.

SWc1 is active only during a period in which SW11 and SW12 are non-active. SWc2 is active only during a period in which SW21 and SW22 are non-active. Here, as mentioned in embodiment 1, the periods in which SWc1 and SWc2 are active are determined taking a trade-off between the pass gain characteristic and the characteristic of leakage between the branches into consideration.

Although the above description has been provided in terms of a case where time-division receiver 300A includes residual charge initializing sections 370-1 and 370-2 in the preceding and following stages of SCFs 340-1 and 340-2, respectively, time-division receiver 300A is not limited to this case. Time-division receiver 300A can provide the effect of reducing leakage between the branches even if time-division receiver 300A includes either one of the residual charge initializing sections.

As described above, residual charge initializing section 370-1 is connected to the path between sampler 320-1 and SCF 340-1 and also to the path between sampler 320-2 and SCF 340-2. Residual charge initializing section 370-1 connects the paths during a period in which SWc1 is active (quiescent period). Residual charge initializing section 370-2 is connected to the path between SCF 340-1 and time-division demultiplexing section 130-1 and also to the path between SCF 340-2 and time-division demultiplexing section 130-2. Residual charge initializing section 370-2 connects the paths during a period in which SWc2 is active (quiescent period). As described above, residual charge initializing sections 370-1 and 370-2 initialize charges remaining in the parasitic capacitances, which are generated on the paths through which respective time-division multiplexed signals pass, when respective first branch signals have passed through the respective paths, before respective second branch signals pass through the respective paths. Consequently, time-division receiver 300A can reduce leakage between the branches.

Figure 23:
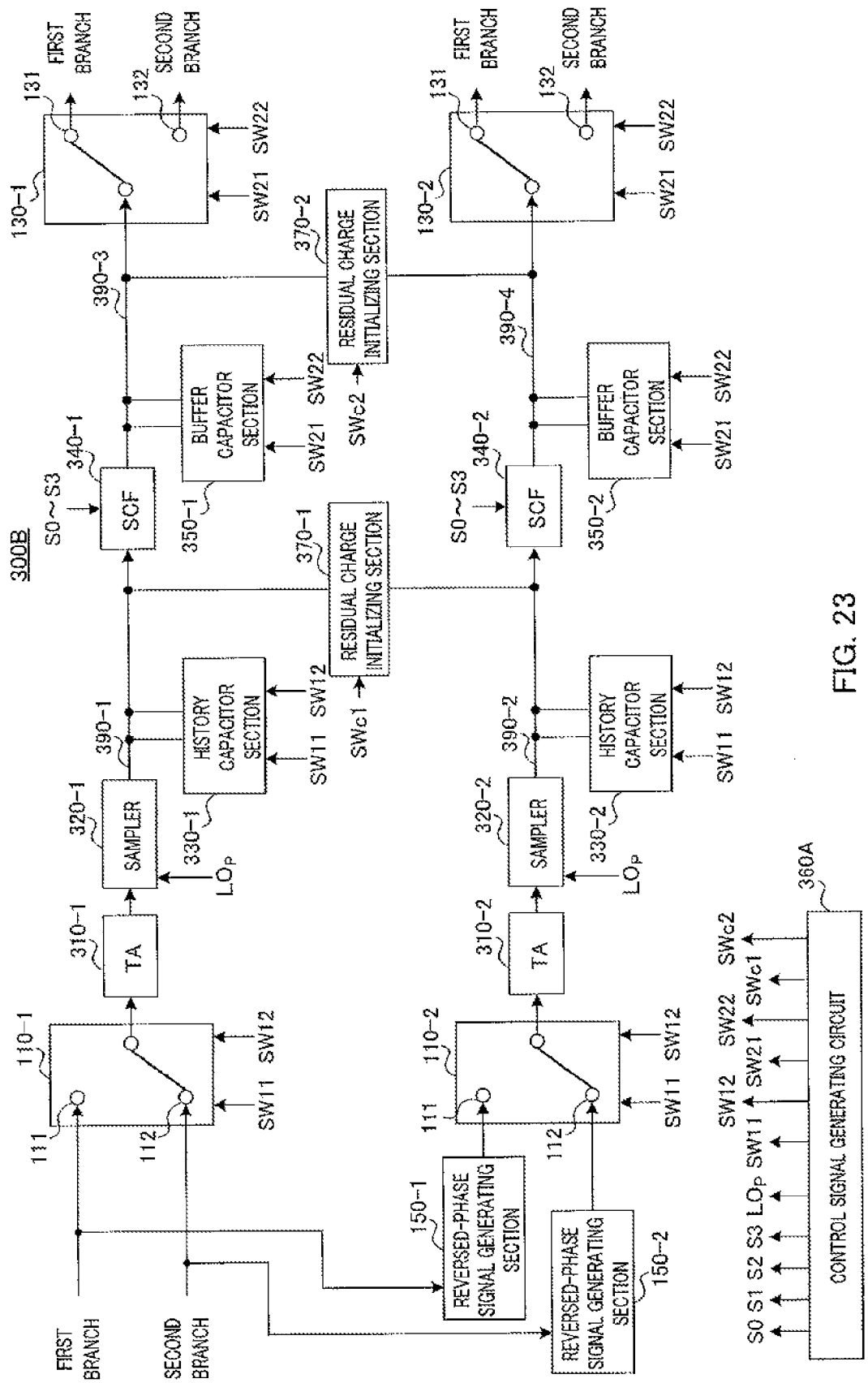
FIG. 23 is a block diagram illustrating another configuration of a time-division receiver according to embodiment 3.

FIG. 23 is a block diagram illustrating another configuration of a time-division receiver according to the present embodiment. In FIG. 23, components that are the same as those in FIG. 20 are provided with reference numerals that are the same as those in FIG. 20 and a description thereof will be omitted. Time-division receiver 300A in FIG. 20 includes reversed-phase signal generating section 150 in the following stage of time-division multiplexing section 110. Meanwhile, time-division receiver 300B in FIG. 23 includes reversed-phase signal generating sections 150-1 and 150-2 in the preceding stage of time-division multiplexing sections 110-1 and 110-2. Operations of time-division multiplexing sections 110-1 and 110-2 and reversed-phase signal generating sections 150-1 and 150-2 are similar to those of time-division multiplexing section 110 and reversed-phase signal generating section 150, respectively, and thus a description thereof will be omitted. Also, operations of TAs 310-1 and 310-2 are similar to that of TA 310, and thus a description thereof will be omitted.

In time-division receiver 300B, residual charge initializing section 370-1 is connected to a path between sampler 320-1 and SCF 340-1 and also to a path between sampler 320-2 and SCF 340-2. Residual charge initializing section 370-1 connects the paths during a period in which SWc1 is active (quiescent period). Residual charge initializing section 370-2 is connected to a path between SCF 340-1 and time-division demultiplexing section 130-1 and also to a path between SCF 340-2 and time-division demultiplexing section 130-2. Residual charge initializing section 370-2 connects the paths during a period in which SWc2 is active (quiescent period). As described above, residual charge initializing sections 370-1 and 370-2 initialize charges remaining in respective parasitic capacitances, which generated on the respective paths through which respective time-division multiplexed signals pass, when respective first branch signals have passed through the respective paths, before respective second branch signals pass through the respective paths. As a result, time-division receiver 300B can reduce leakage between the branches.

Figure 24:
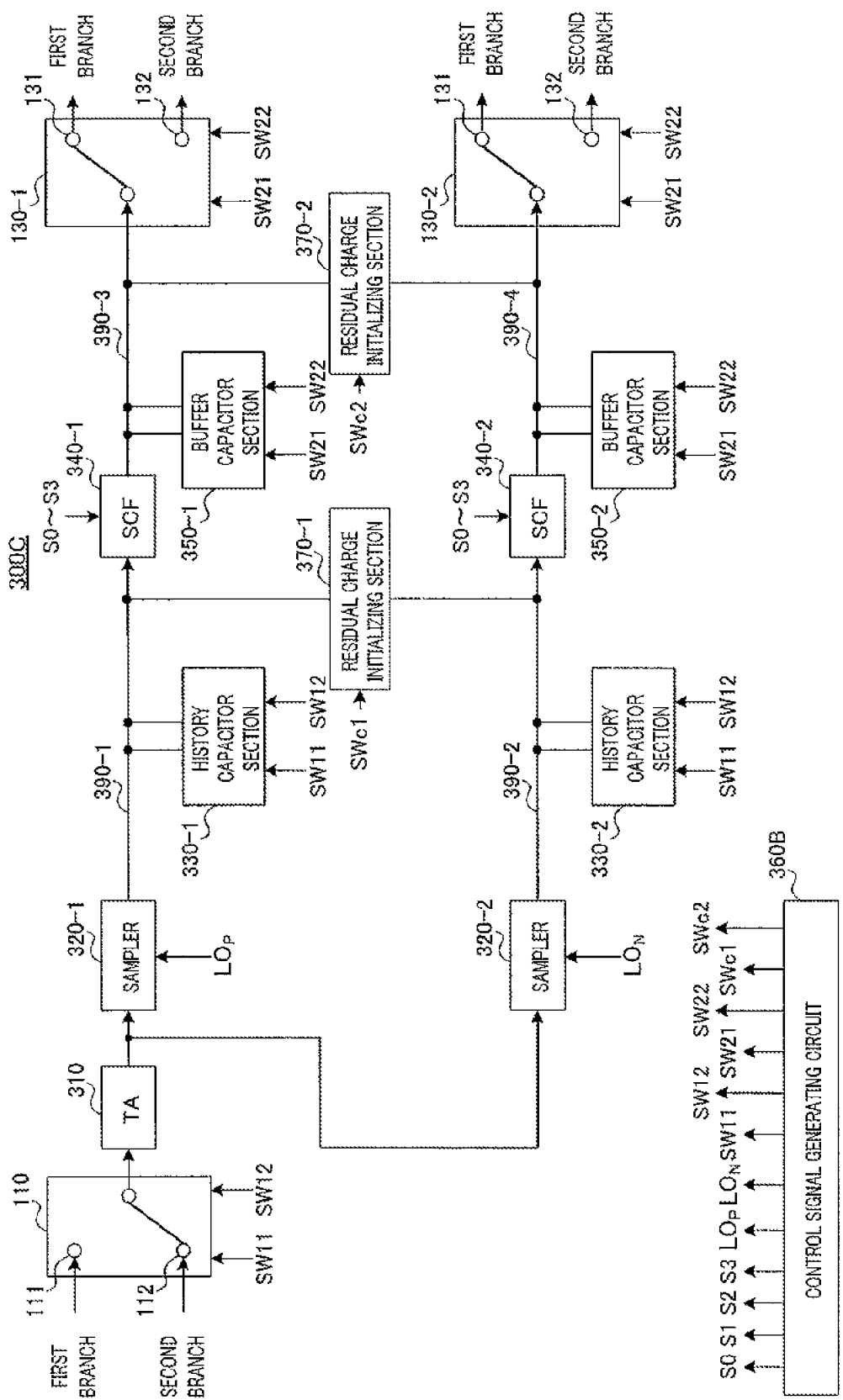
FIG. 24 is a block diagram illustrating still another configuration of a time-division receiver according to embodiment 3.

FIG. 24 is a block diagram illustrating still another configuration of a time-division receiver according to the present embodiment in FIG. 24, components that are the same as those in FIG. 20 are provided with reference numerals that are the same as those in FIG. 20 and a description thereof will be omitted. Time-division receiver 300C in FIG. 24 employs a configuration of time-division receiver 300A in FIG. 20 with control signal generating circuit 360B provided instead of control signal generating circuit 360A and with reversed-phase signal generating section 150 removed.

As with control signal generating circuit 360A, control signal generating circuit 360B generates control signals SW11, SW12, SW21, SW22, SWc1, SWc2 and S0 to S3, and local signal $LO_P$. Furthermore, control signal generating circuit 360B generates local signal $LO_N$ obtained by reversing a phase of local signal $LO_P$, and supplies local signal $LO_N$ to sampler 320-2. Consequently, a reversed-phase baseband signal is output from sampler 320-2.

Figure 25:
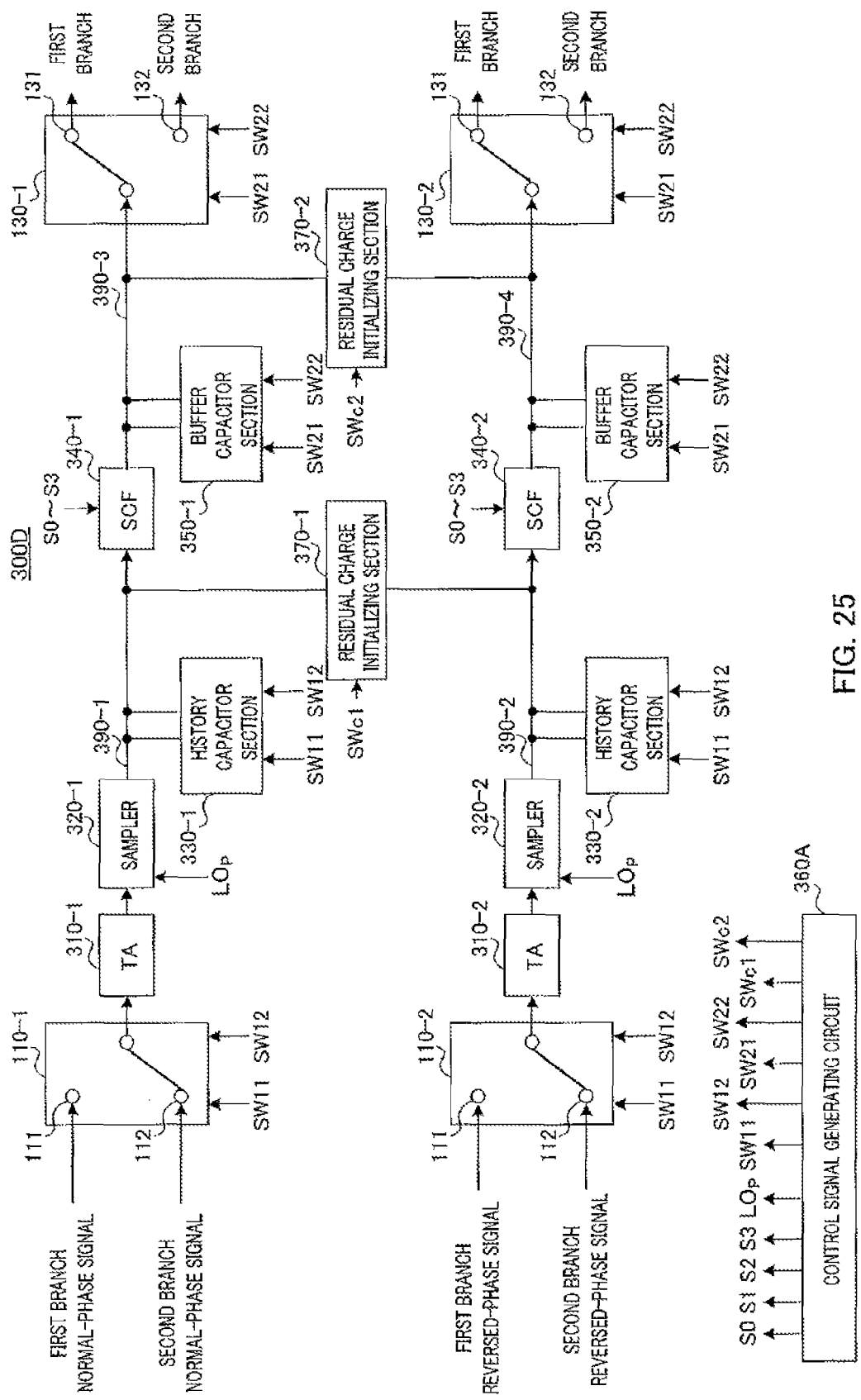
FIG. 25 is a block diagram illustrating still another configuration of a time-division receiver according to embodiment 3.

FIG. 25 is a block diagram illustrating still another configuration of a time-division receiver according to the present embodiment. In FIG. 25, components that are the same as those in FIG. 23 are provided with reference numerals that are the same as those in FIG. 23 and a description thereof will be omitted. Time-division receiver 300D in FIG. 25 employs a configuration of time-division receiver 300B in FIG. 23 with reversed-phase signal generating sections 150-1 and 150-2 to removed. Time-division receiver 300D in FIG. 25 provides an example configuration for a case where normal-phase signals for first and second branches and reversed-phase signals for the first and second branches are input, respectively.

Figure 26:
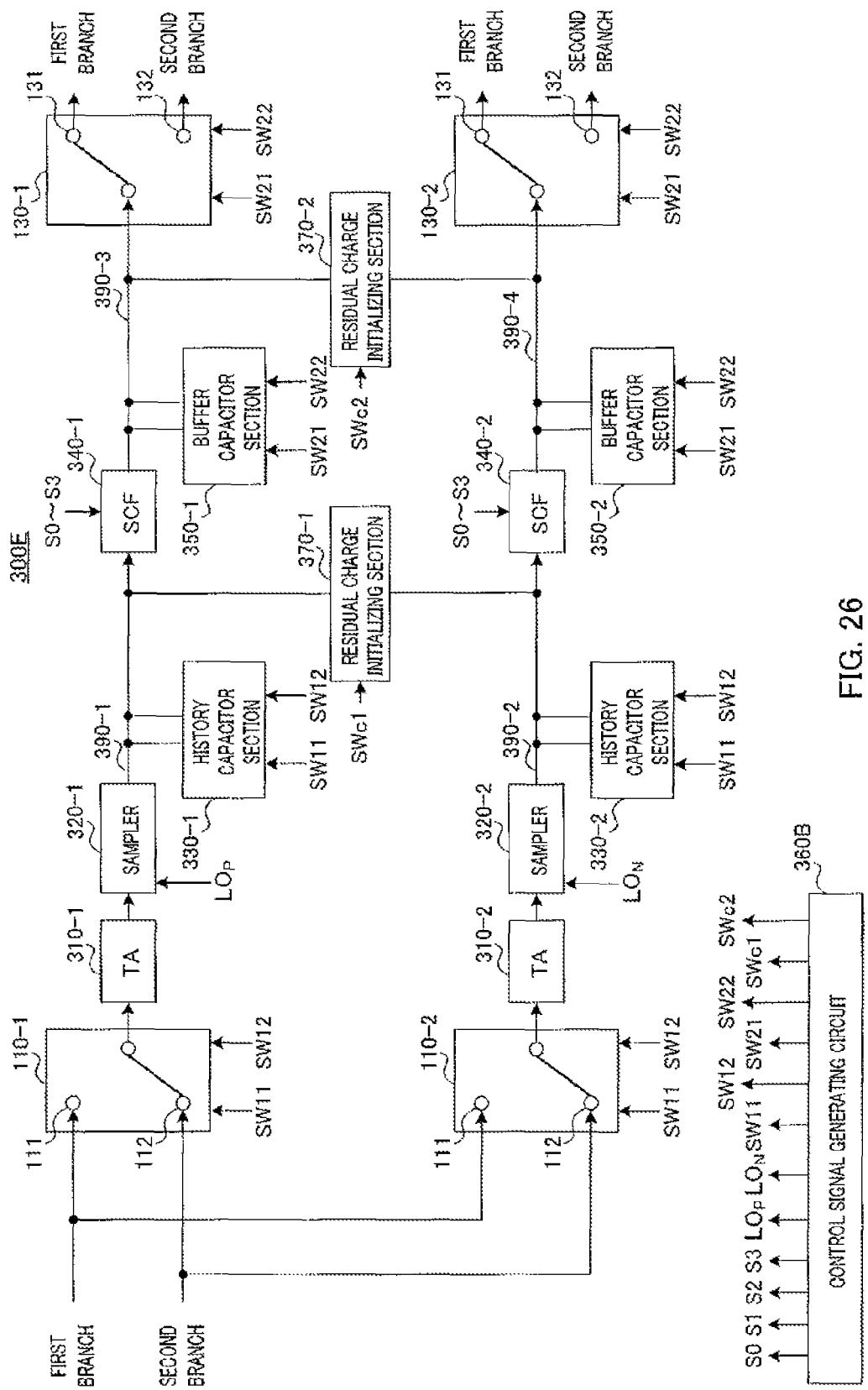
FIG. 26 is a block diagram illustrating still another configuration of a time-division receiver according to embodiment 3.

FIG. 26 is a block diagram illustrating still another configuration of a time-division receiver according to the present embodiment. In FIG. 26, components that are the same as those in FIG. 23 are provided with reference numerals that are the same as those in FIG. 23 and a description thereof will be omitted. Time-division receiver 300E in FIG. 26 employs a configuration of time-division receiver 300B in FIG. 23 with control signal generating circuit 360B provided instead of control signal generating circuit 360A and with reversed-phase signal generating sections 150-1 and 150-2 removed. In time-division receiver 300E in FIG. 26, control signal generating circuit 360B supplies local signal $LO_N$ obtained by reversing a phase of local signal $LO_p$ to sampler 320-2. Consequently, a reversed-phase baseband signal is output from sampler 320-2.

Embodiment 4

Figure 27:
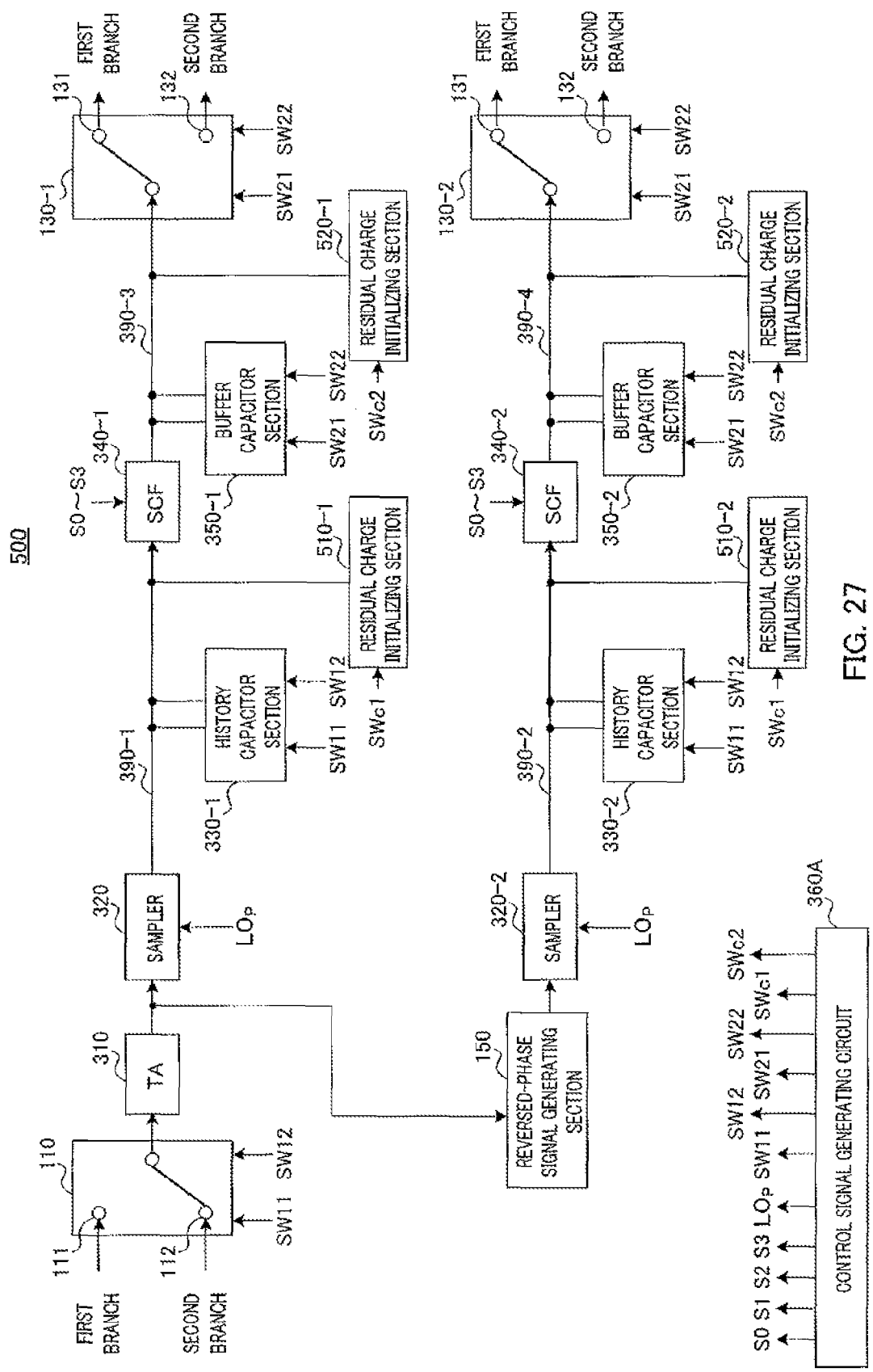
FIG. 27 is a block diagram illustrating a configuration of a time-division receiver according to embodiment 4 of the present invention.

FIG. 27 is a block diagram illustrating a configuration of a time-division receiver 500 according to the present embodiment. In FIG. 27, components that are the same as those in FIG. 20 are provided with reference numerals that are the same as those in FIG. 20 and a description thereof will be omitted. Time-division receiver 500 in FIG. 27 includes residual charge initializing sections 510-1, 510-2, 520-1 and 520-2 instead of residual charge initializing sections 370-1 and 370-2 in time-division receiver 300A in FIG. 20.

Each of residual charge initializing sections 510-1, 510-2, 520-1 and 520-2 employs a configuration similar to that of residual charge initializing sections 210-1 and 210-2 (see FIG. 16), and includes switch 161 and charge supply section 211.

In residual charge initializing section 510-1 (510-2), switch 161 is on during a period in which SWc1 is active, whereby a normal-phase (reversed-phase) circuit and charge supply section 211 are in a conducting state. Also, in residual charge initializing section 510-1 (510-2), switch 161 is off during a period in which SWc1 is non-active, whereby the normal-phase (reversed-phase) circuit and charge supply section 211 are in a non-conducting state.

Also, in residual charge initializing section 520-1 (520-2), switch 161 is on dining a period in which SWc2 is active, whereby the normal-phase (reversed-phase) circuit and charge supply section 211 are in a conducting state. Also, in residual charge initializing section 520-1 (520-2), switch 161 is off during a period in which SWc2 is non-active, whereby the normal-phase (reversed-phase) circuit and charge supply section 211 are in a non-conducting state.

In a conducting state, charge supply section 211 in each of residual charge initializing sections 510-1, 510-2, 520-1 and 520-2 supplies charge to a parasitic capacitance to bring the charge in the parasitic capacitance to a reference charge level. As described above, residual charge initializing section 510-1 (510-2) initializes a residual charge generated on an output path for sampler 320-1 (320-2). Residual charge initializing section 520-1 (520-2) initializes a residual charge generated on an output path for SCF 340-1 (340-2).

As described above, residual charge initializing section 510-1 is connected to a path between sampler 320-1 and SCF 340-1. Residual charge initializing section 510-1 connects charge supply section 211 and the path during a period in which SWc1 is active (quiescent period). Residual charge initializing section 520-1 is connected to a path between SCF 340-1 and time-division demultiplexing section 130-1. Residual charge initializing section 520-1 connects charge supply section 211 and the path during a period in which SWc2 is active (quiescent period). Also, residual charge initializing section 510-2 is connected to a path between sampler 320-2 and SCF 340-2. Residual charge initializing section 510-2 connects charge supply section 211 and the path during a period in which SWc1 is active (quiescent period). Residual charge initializing section 520-2 is connected to a path between SCF 340-2 and a time-division demultiplexing section 130-2. Residual charge initializing section 520-2 connects charge supply section 211 and the path during a period in which SWc2 is active (quiescent period). As described above, each of residual charge initializing sections 510-1, 510-2, 520-1 and 520-2 initializes a charge remaining in the respective parasitic capacitance, which is generated on the respective path through which a respective time-division multiplexed signal passes, when a respective first branch signal has passed through the respective path, before a respective second branch signal passes through the respective path. As a result, time-division receiver 500 can reduce leakage between the branches.

Also, in the case where charge supply section 211 is a voltage source that can stably supply charge, time-division receiver 500 can mitigate leakage between the branches with higher precision compared to time-division receiver 300A according to embodiment 3.

Also, the present embodiment can be applied to non-differential systems as well as differential systems. However, in the case where charge supply section 211 that can stably supply charge is provided, the present embodiment can provide higher performance in mitigating leakage between the branches, compared to embodiment 3, but causes a large circuit impact.

Embodiment 5

Figure 28:
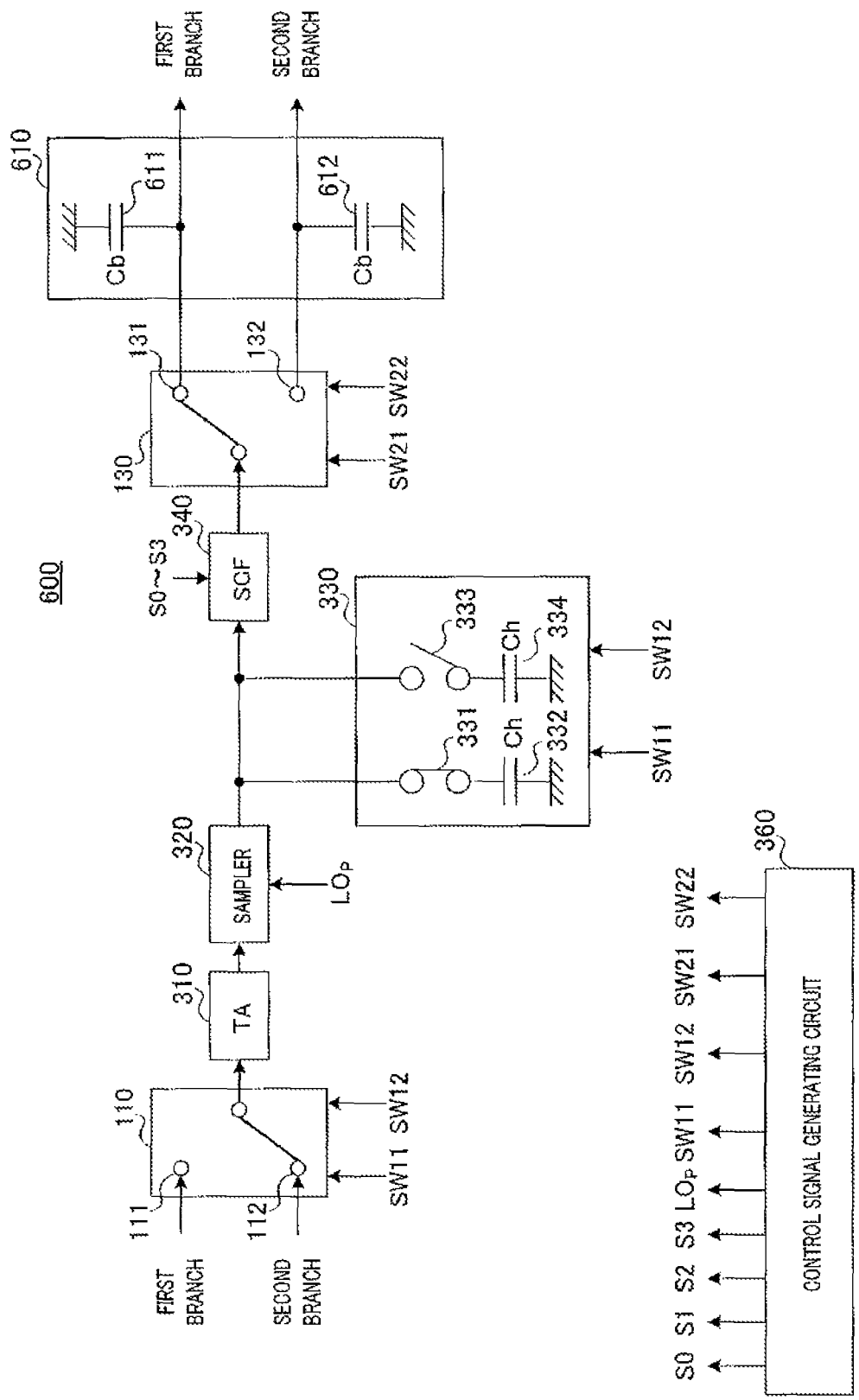
FIG. 28 is a block diagram illustrating a configuration of a time-division receiver to which the present invention is applied.

FIG. 28 is a block diagram illustrating a configuration of a time-division receiver to which the present invention is applied. In FIG. 28, components that are the same as those in FIG. 17 are provided with reference numerals that are the same as those in FIG. 17 and a description thereof will be omitted. Time-division receiver 600 in FIG. 28 includes buffer capacitor section 610 instead of buffer capacitor section 350 in time-division receiver 300 in FIG. 17.

In FIG. 28 tittle-division receiver 600 includes time-division multiplexing section 110, time-division demultiplexing section 130, TA 310, sampler 320, history capacitor section 330, SCF 340, buffer capacitor section 610 and control signal generating circuit 360.

Buffer capacitor section 610 includes Cbs 611 and 612. Meanwhile, buffer capacitor section 350 includes Cbs 352 and 354 and switches 351 and 353. In other words, buffer capacitor section 610 has a smaller number of parts compared to buffer capacitor section 350 because of lack of switches 351 and 353. Therefore, time-division receiver 600 can have a reduced circuit size compared to time-divisions receiver 300.

Cb 611 is connected to a Cr in SCF 340 during a period in which SW21 is active. Cb 612 is connected to a Cr in SCF 340 during a period in which SW22 is active. Consequently, in the present embodiment, IIR filtering is performed for each of first and second branches.

A configuration of time-division receiver 600 to which the present invention is applied has been described above.

Next, time-division receiver 600A according to an embodiment of the present invention will be described.

Figure 29:
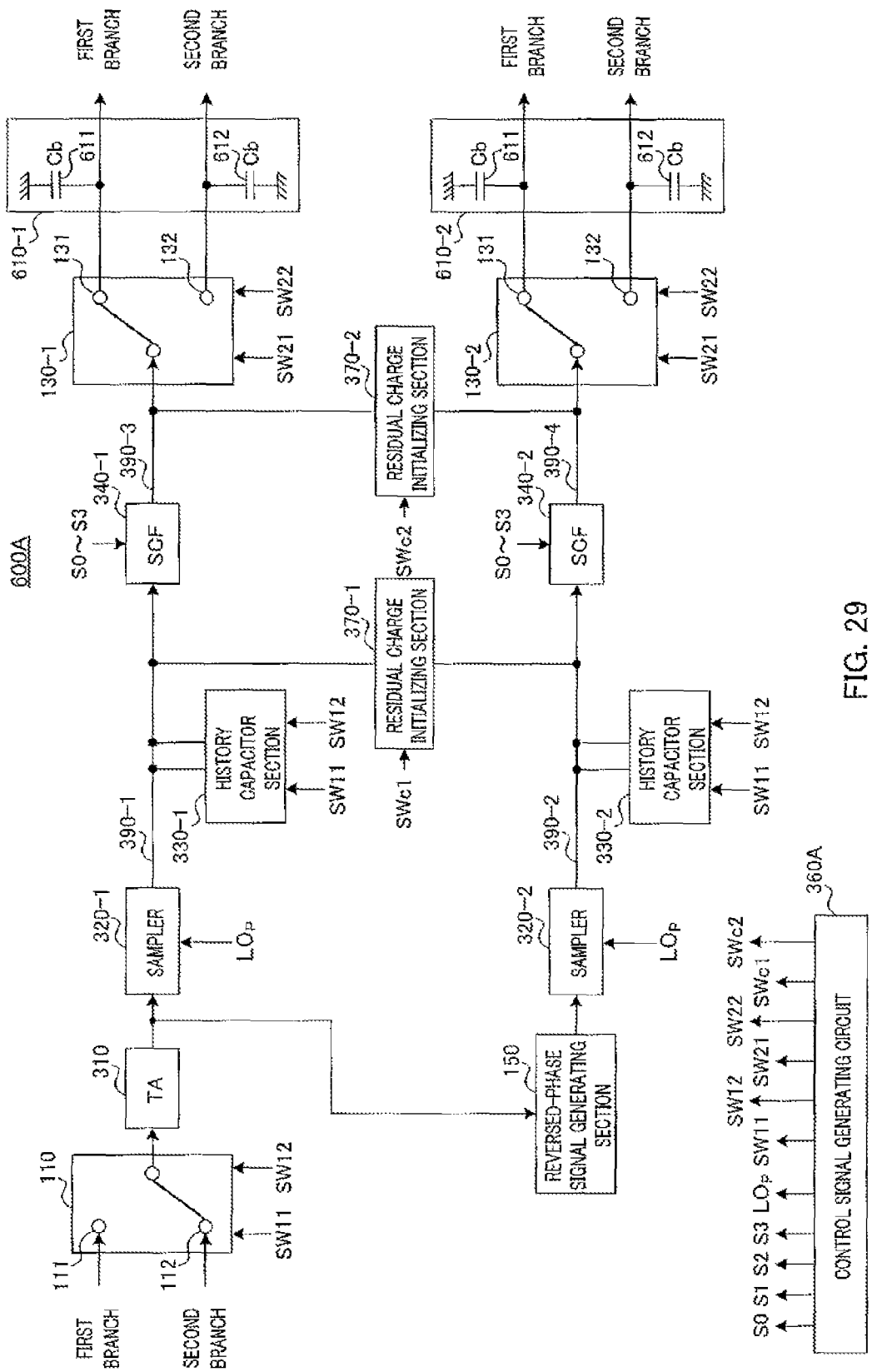
FIG. 29 is a block diagram illustrating a configuration of a time-division receiver according to embodiment 5 of the present invention.

FIG. 29 is a block diagram illustrating a configuration of a time-division receiver 600A according to the present embodiment. In FIG. 29, components that are the same as those in FIG. 28 are provided with reference numerals that are the same as those in FIG. 28 and a description thereof will be omitted.

In FIG. 29, time-division receiver 600A includes time-division multiplexing section 110, TA 310, samplers 320-1 and 320-2, reversed-phase signal generating section 150, history capacitor sections 330-1 and 330-2, SCFs 340-1 and 340-2, residual charge initializing sections 370-1 and 370-2, control signal generating circuit 360A, time-division demultiplexing sections 130-1 and 130-2 and buffer capacitor sections 610-1 and 610-2. Here, a configuration and an operation of each of buffer capacitor sections 610-1 and 610-2 are similar to those of buffer capacitor section 610, and a description thereof will be omitted.

Here, differences between time-division receiver 300A in FIG. 20 and time-division receiver 600A in FIG. 29 will be described.

In time-division receiver 300A, during a period in which SW21 and SW22 is non-active (that is a period in which SWc2 is active), no signals are output to output terminals 131 and 132 (zero padding). Therefore, in time-division receiver 300A, there is a period in which output terminal 131 and output terminal 132 output no signals at all. As a result, an aliasing signal generated in a cycle corresponding to a branch switching rate is output from time-division receiver 300A.

In time-division receiver 600A, during a period in which SW21 and SW22 is non-active (that is, a period in which SWc2 is active), no signals are output to output terminals 131 and 132 as in time-division receiver 300A. However, Cbs 611 and 612 connected to output terminals 131 and 132 retain immediately previous baseband signals for first and second branches, respectively. Therefore, in time-division receiver 600A, even during a period in which SW21 and SW22 is non-active (that is, a period in which SWc2 is active), signals are output from buffer capacitor sections 610-1 and 610-2. As a result, time-division receiver 600A can suppress aliasing signals.

Figure 30B:
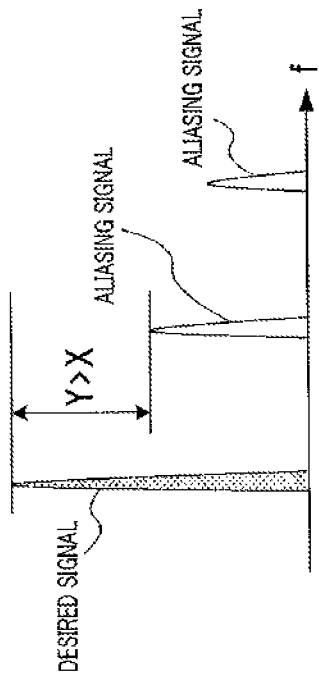
FIG. 30 includes diagrams each illustrating spectra of a desired signal and an aliasing signal.
Figure 30A:
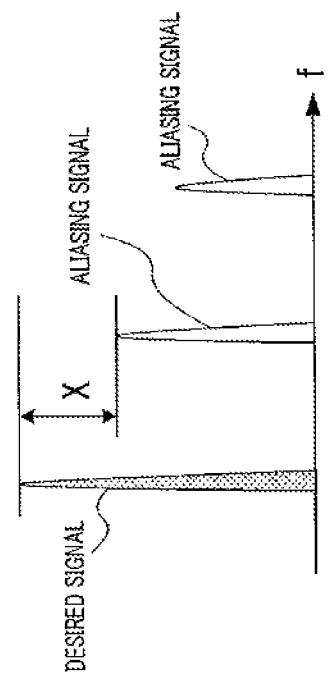

FIG. 30 includes diagrams each illustrating spectra of a desired signal and an aliasing signal. FIG. 30A is a diagram illustrating spectra of a desired signal and an aliasing signal in time-division receiver 300A. FIG. 30B is a diagram illustrating spectra of a desired signal and an aliasing signal in time-division receiver 600A. As can be seen from FIGS. 30A and 30B time-division receiver 600A provides a smaller aliasing signal spectrum with reference to a desired signal spectrum compared to time-division receiver 300A.

This is because Cbs 611 and 612 in buffer capacitor sections 610-1 and 610-2 provided in the following stage of time-division demultiplexing sections 130-1 and 130-2 retain immediately previous branch signal components during a period in which neither first branch signal nor second branch signal is input.

With the configuration described above, in a Ch connected to a branch for which no signal is output from time-division demultiplexing section 130-1 (130-2), from among Cbs 611 and 612, a charge of immediately previous signal components is retained. Consequently, an output voltage from each of buffer capacitor sections 610-1 and 610-2 becomes equal to that of a state in which the immediately previous signal components have passed. As a result, time-division receiver 600A can suppress aliasing signals contained in an output signal, compared to time-division receiver 300A. Therefore, time-division receiver 600A enables mitigation of required characteristics of filters that are necessary to be provided in the following stage of time-division receiver 600A for aliasing signal removal.

As described above, residual charge initializing section 370-1 is connected to a path between sampler 320-1 and SCF 340-1 and also to a path between sampler 320-2 and SCF 340-2. Residual charge initializing section 370-1 connects the paths during a period in which SWc1 is active (quiescent period). Residual charge initializing section 370-2 is connected to a path between SCF 340-1 and time-division demultiplexing section 130-1 and also to a path between SCF 340-2 and time-division demultiplexing section 130-2. Residual charge initializing section 370-2 connects the paths during a period in which SWc2 is active (quiescent period). As described above, residual charge initializing sections 370-1 and 370-2 initialize charges remaining respective parasitic capacitances, which are generated on respective paths through which respective time-division multiplexed signals pass, when respective first branch signals have passed through the respective paths, before respective second branch signals pass through the respective paths. As a result, time-division receiver 600A can reduce leakage between the branches.

Figure 31:
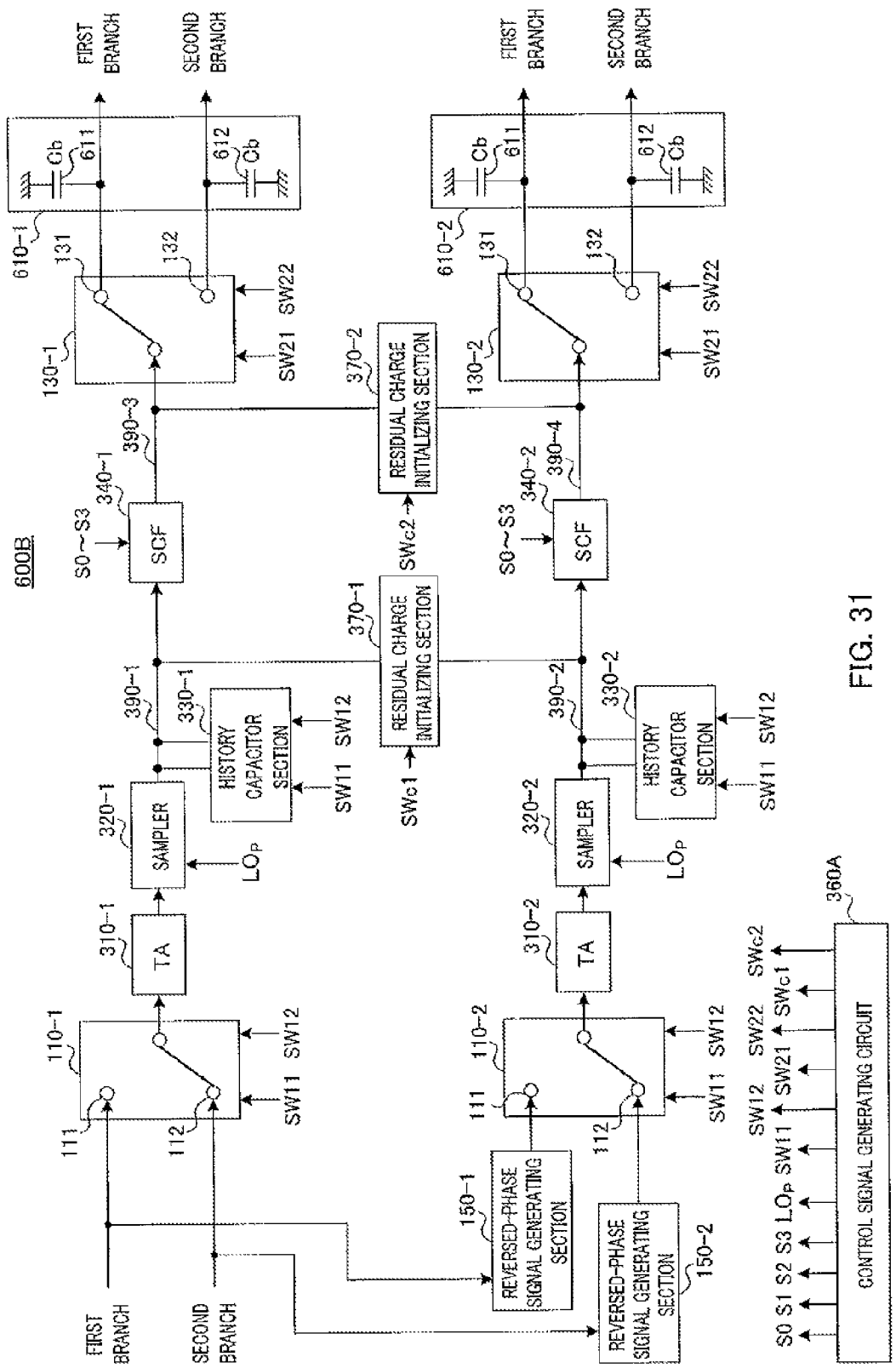
FIG. 31 is a block diagram illustrating another configuration of a time-division receiver according to embodiment 5.

FIG. 31 is a block diagram illustrating another configuration of a time-division receiver according to the present embodiment in FIG. 31, time-division receiver 600B includes reversed-phase signal generating sections 150-1 and 150-2, time-division multiplexing sections 110-1 and 110-2, TAs 310-1 and 310-2, samplers 320-1 and 320-2, history capacitor sections 330-1 and 330-2, SCFs 340-1 and 340-2, residual charge initializing sections 370-1 and 370-2, control signal generating circuit 360A, time-division demultiplexing sections 130-1 and 130-2, and buffer capacitor sections 610-1 and 610-2.

In time-division receiver 600B, residual charge initializing section 370-1 is connected to a path between sampler 320-1 and SCF 340-1 and also to a path between sampler 320-2 and SCF 340-2. Residual charge initializing section 370-1 connects the paths during a period in which SWc1 is active (quiescent period). Residual charge initializing section 370-2 is connected to a path between SCF 340-1 and time-division demultiplexing section 130-1 and also to a path between SCF 340-2 and time-division demultiplexing section 130-2.

Residual charge initializing section 370-2 connects the paths in during a period in which SWc2 is active (quiescent period). As described above, residual charge initializing sections 370-1 and 370-2 initialize charges remaining in respective parasitic capacitances, which are generated on respective paths through which respective time-division multiplexed signals pass when respective first branch signals have passed through the respective paths before respective second branch signals pass through the respective paths. As a result, time-division receiver 600B can reduce leakage between the branches.

Figure 32:
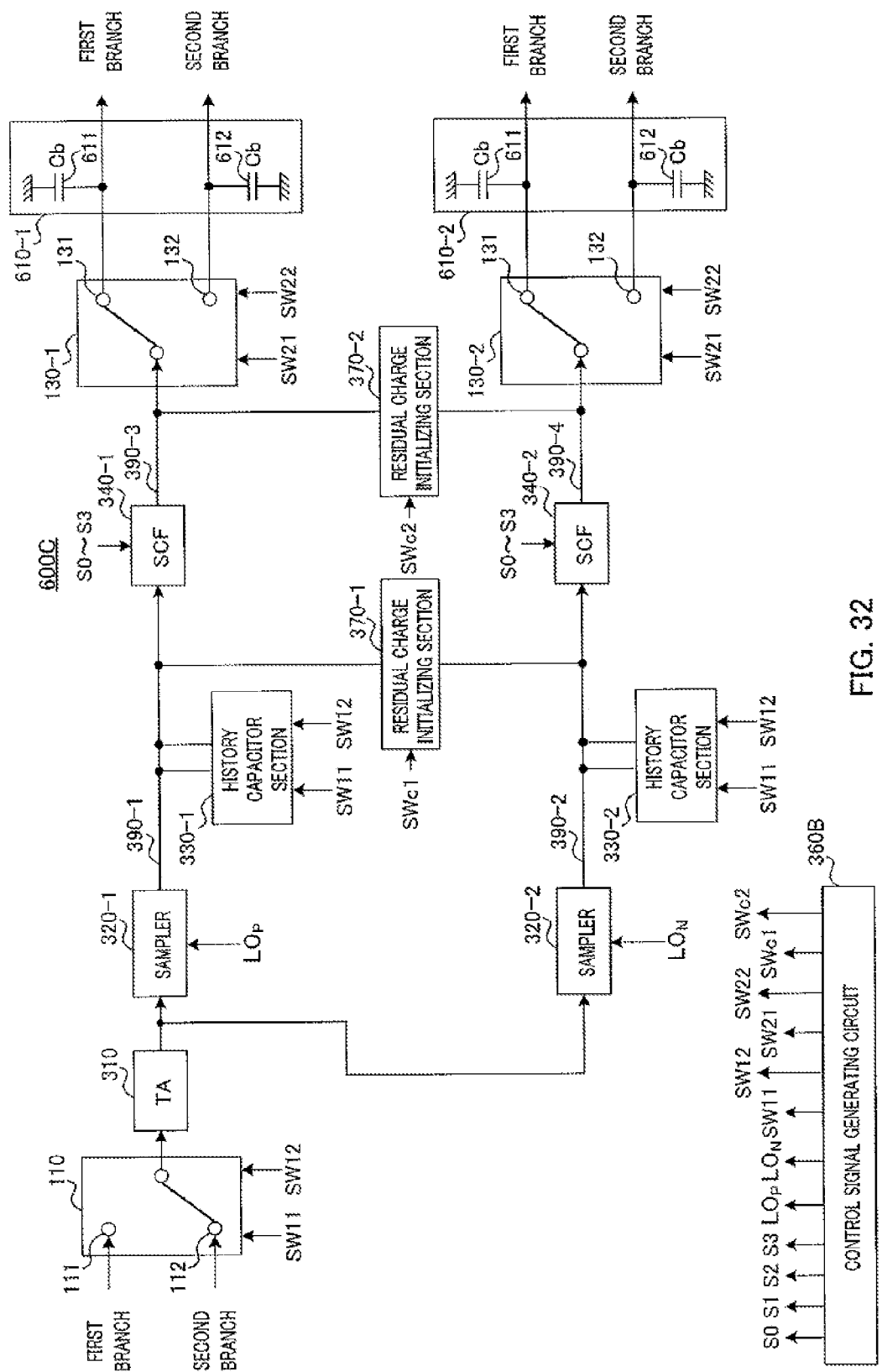
FIG. 32 is a block diagram illustrating still another configuration of a time-division receiver according to embodiment 5.

FIG. 32 is a block diagram illustrating still another configuration of a time-division receiver according to the present embodiment. In FIG. 32, components that are the same as those in FIG. 29 are provided with reference numerals that are the same as those in FIG. 29 and a description thereof will be omitted. Time-division receiver 600C in FIG. 32 employs a configuration of time-division receiver 600A in FIG. 29 with control signal generating circuit 360B provided instead of control signal generating circuit 360A and with reversed-phase signal generating section 150 removed. In time-division receiver 600C in FIG. 32, control signal generating circuit 360B supplies local signal $LO_N$ obtained by reversing a phase of local signal. $LO_p$ to sampler 320-2. Consequently, a reversed-phase baseband signal is output from sampler 320-2.

Figure 33:
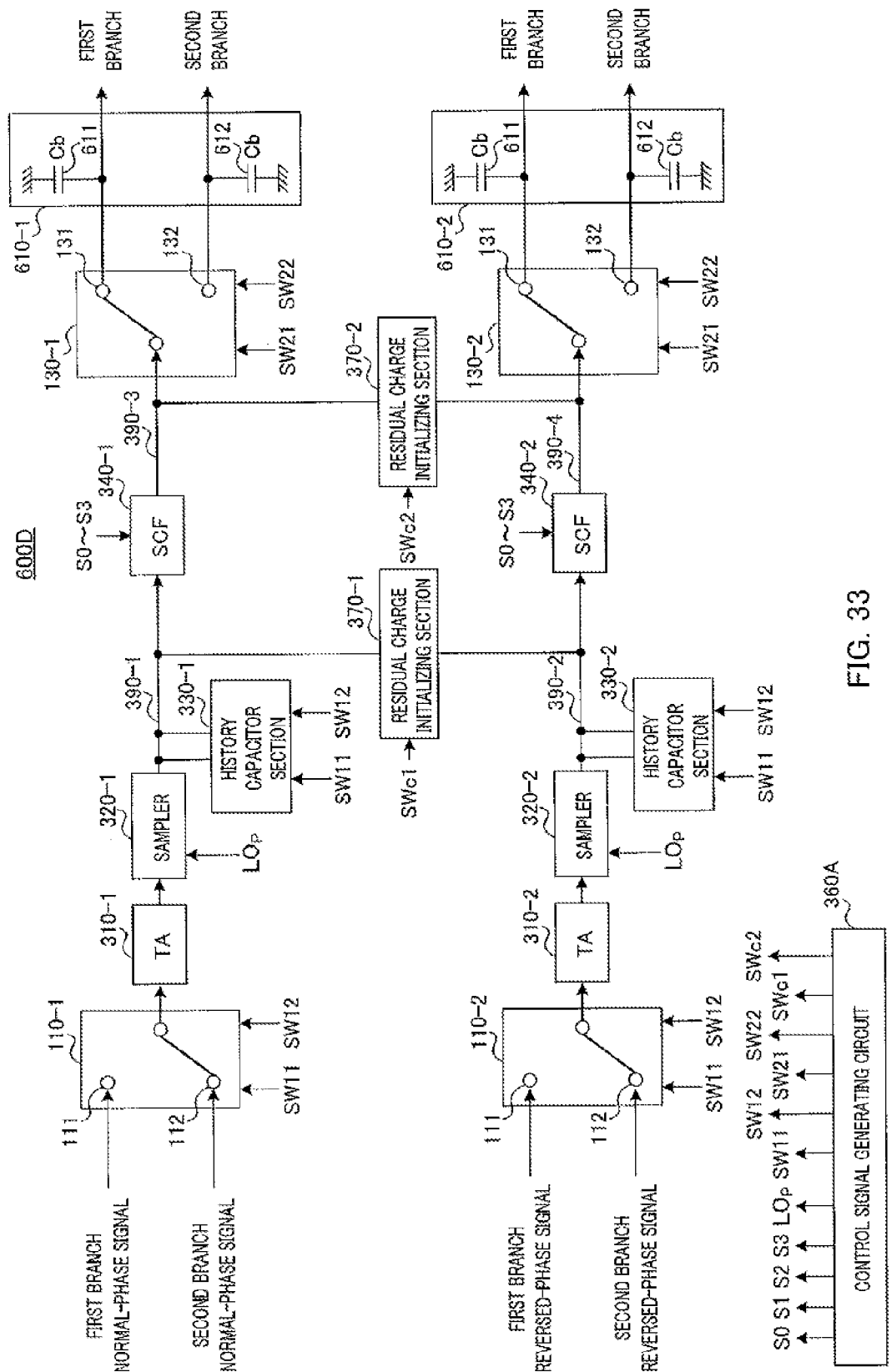
FIG. 33 is a block diagram illustrating still another configuration of a time-division receiver according to embodiment 5.

FIG. 33 is a block diagram illustrating still another configuration of a time-division receiver according to the present embodiment. In FIG. 33, components that are the same as those in FIG. 31 are provided with reference numerals that are the same as those in FIG. 31 and a description thereof will be omitted. Time-division receiver 600B in FIG. 33 employs a configuration of time-division receiver 600B in FIG. 31 with reversed-phase signal generating sections 150-1 and 150-2 is removed. Time-division receiver 600D in FIG. 33 provides an example configuration where normal-phase signals for first and second branches and reversed-phase signal for first and second branches are input, respectively.

Figure 34:
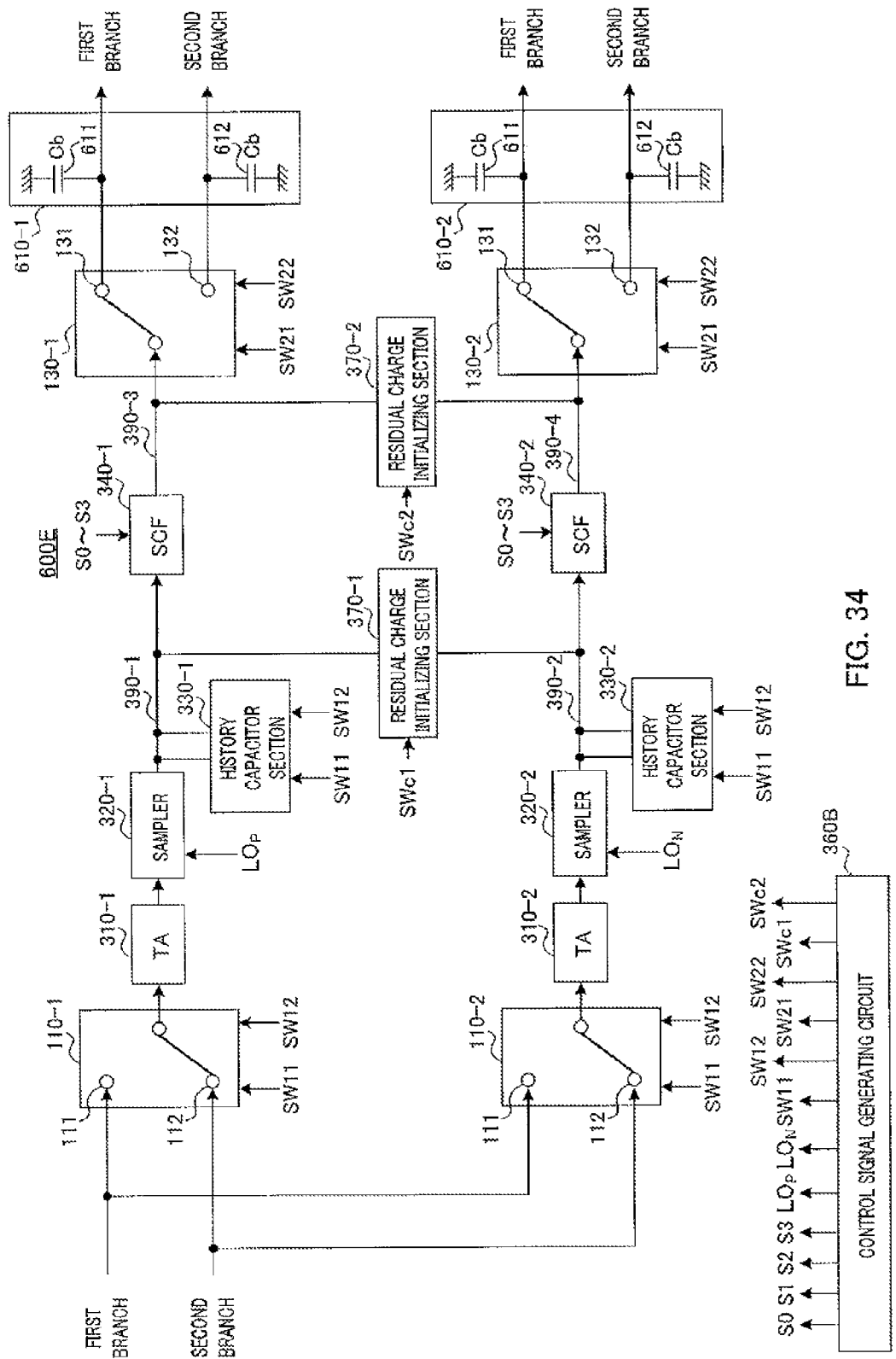
FIG. 34 is a block diagram illustrating still another configuration of a time-division receiver according to embodiment 5.

FIG. 34 is a block diagram illustrating still another configuration of a time-division receiver according to the present embodiment. In FIG. 34, components that are the same as those in FIG. 31 are provided, with reference numerals that are the same as those in FIG. 31 and a description thereof will be omitted. Time-division receiver 600E in FIG. 34 employs a configuration of time-division receiver 600B in FIG. 31 with control signal generating circuit 360B provided instead of control signal generating circuit 360A and with reversed-phase signal generating sections 150-1 and 150-2 removed. In time-division receiver 600E in FIG. 34, control signal generating circuit 360B supplies local signal $LO_N$ obtained by reversing a phase of local signal $LO_p$ to sampler 320-2. Consequently, reversed-phase baseband signal is output from sampler 320-2.

Figure 35:
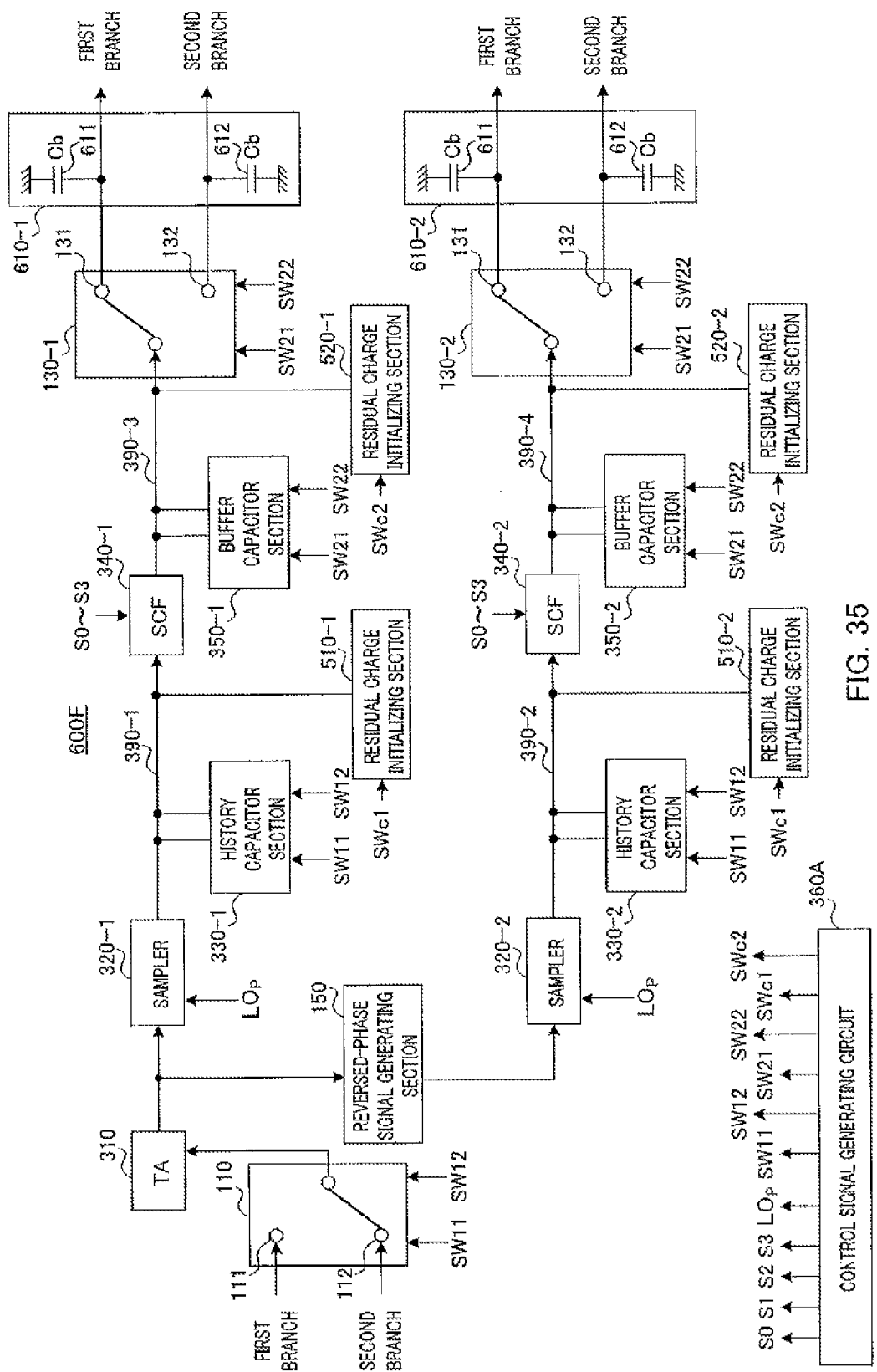
FIG. 35 is a block diagram illustrating still a other configuration of a time-division receiver according to embodiment 5.

FIG. 35 is a block diagram illustrating still another configuration of a time-division receiver according to the present embodiment in FIG. 35, time-division receiver 600F includes time-division multiplexing section 110, TA 310, samplers 320-1 and 320-2, reversed-phase signal generating section 150, history capacitor sections 330-1 and 330-2. SCFs 340-1 and 340-2, residual charge initializing sections 510-1, 510-2, 520-1 and 520-2, control signal generating circuit 360A, time-division demultiplexing sections 130-1 and 130-2, and buffer capacitor sections 610-1 and 610-2.

In time-division receiver 600F, residual charge initializing section 510-1 is connected to a path between sampler 320-1 and SCF 340-1. Residual charge initializing section 510-1 connects charge supply section 211 and the path during a period in which SWc1 is active (quiescent period). Residual charge initializing section 520-1 is connected to a path between SCF 340-1 and time-division section 130-1. Residual charge initializing section 520-1 connects charge supply section 211 and the path during a period in which SWc2 is active (quiescent period). Residual charge initializing section 510-2 is connected to a path between sampler 320-2 and SCF 340-2. Residual charge initializing section 510-2 connects charge supply section 211 and the path during a period in which SWc1 is active (quiescent period). Residual charge initializing section 520-2 is connected to a path between SCF 340-2 and time-division section 130-2. Residual charge initializing section 520-2 connects charge supply section 211 and the path during a period in which SWc2 is active (quiescent period). As described above, residual charge initializing sections 510-1, 510-2, 520-1 and 520-2 initialize charges remaining in respective parasitic capacitances, which are generated on the respective paths through which respective time-division multiplexed signals pass, when respective first branch signals have passed through the respective paths, before respective second branch signals pass through the paths. As a result, time-division receiver 600F can reduce leakage between the branches.

As in time-division receiver 600A, in time-division receivers 600B, 600C, 600D, 600E and 600F, buffer capacitor sections 610-1 and 610-2 are provided in the following stage of time-division demultiplexing sections 130-1 and 130-2, respectively. Therefore, time-division receiver 600C can mitigate required characteristics of filters in the following stage thereof.

The respective embodiments have been described above.

Figure 36:
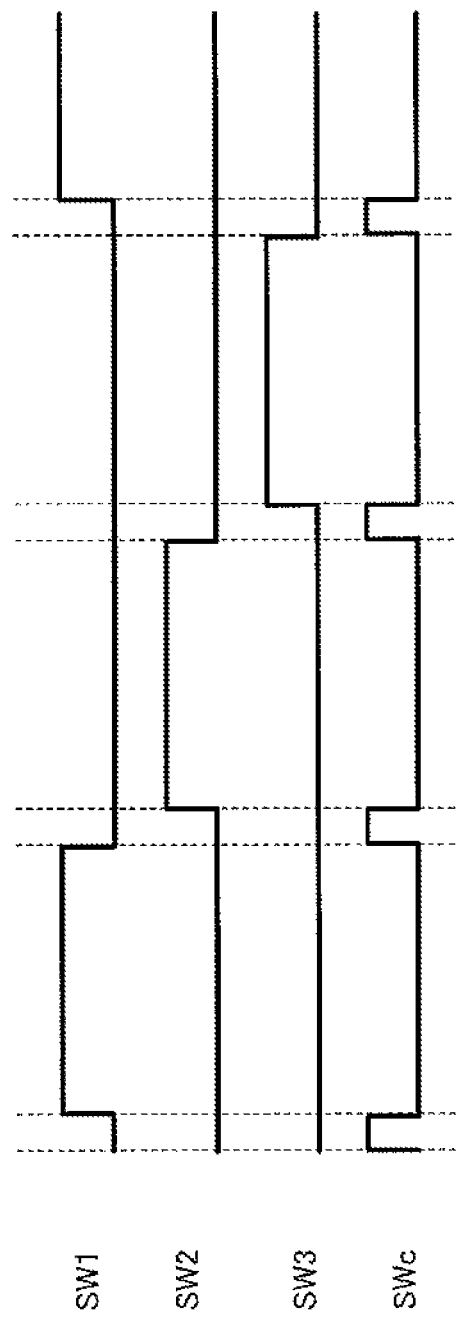
FIG. 36 is a diagram illustrating an example of control signals where the branch count is three.

The above description, has been provided taking a case where the branch count is two as an example, but the branch count is not limited to two. The present invention can also be applied to a case where streams with a branch count of three or more are time-division multiplexed. FIG. 36 is a diagram illustrating an example of respective control signals where the branch count is three. Also in the case where the branch count is three, it is only necessary that a time-division multiplexing section generates a time-division multiplexed signal including quiescent period between the respective branches and a residual charge initializing section initializes a residual charge during the quiescent period.

The entire disclosure of the description, the drawings and the abstract included in Japanese Patent Application No. 2010-292716 filed on Dec. 28, 2010 is incorporated herein by reference.

INDUSTRIAL APPLICABILITY

A time-division receiver and a time-division receiving method according to the present invention are useful for e.g., a receiver in a MIMO system requiring simultaneous reception of radio-frequency signals for a plurality of branches.

REFERENCE SIGNS LIST 100, 100A, 100B, 100C, 100D, 100E, 200, 300, 300A, 300B, 300C, 300D, 300E, 500, 600, 600A, 600B, 600C, 600D, 600E, 600F Time-division receiver
110, 110-1, 110-2 Time-division multiplexing section
111, 112 Input terminal
120, 120-1, 120-2 Mixer
130, 130-1, 130-2 Time-division demultiplexing section
131, 132 Output terminal
140, 140A, 140B, 360, 360A, 360B Control signal generating circuit
150, 150-1, 150-2 Reversed-phase signal generating section
160, 210-1, 210-2, 370-1, 370-2, 510-1, 510-2, 520-1, 520-2 Residual charge initializing section
161, 331, 333, 351, 353, 410, 412, 413, 414, 420, 422, 423, 424, 430, 432, 433, 434, 440, 442, 443, 444 Switch
170-1, 170-2, 180-1, 180-2, 390-1, 390-2, 390-3, 390-4 Time-division shared signal line
190-1, 190-2, 380-1, 380-2, 380-3, 380-4 Parasitic capacitance
211 charge supply section
310, 310-1, 310-2 TA
320, 320-1, 320-2 Sampler
330, 330-1, 330-2 History capacitor section
340, 340-1, 340-2 SCF
350, 350-1, 350-2, 510-1, 510-2, 610-1, 610-2 Buffer capacitor section
332, 334 Ch
352, 354, 611, 612 Cb
411, 421, 431, 441 Cr

The invention claimed is:

1. A time-division receiver comprising:
a mixer that down-converts a time-division multiplexed signal resulting from a plurality of branch signals being time-division multiplexed;
a demultiplexer that demultiplexes the time-division multiplexed signal down-converted by the mixer, into respective branch signals; and
an initializer that initializes a charge remaining in a parasitic capacitance, the parasitic capacitance being generated on a path between the mixer and the demultiplexer, when a first branch signal has passed through the path, before a second branch signal passes through the path.

2. The time-division receiver according to claim 1, further comprising a generator that generates the time-division multiplexed signal including a quiescent period between the first branch signal and the second branch signal,
wherein the initializer initializes the charge in the quiescent period.

3. The time-division receiver according to claim 1, wherein the quiescent period is determined based on a pass gain characteristic and a reception characteristic for the first branch signal or the second branch signal.

4. The time-division receiver according to claim 2, wherein:
the mixer includes a first mixer that processes a normal-phase signal in a differential system and a second mixer that processes a reversed-phase signal in the differential system; and
the initializer includes a switch that connects an output path for the first mixer and an output path for the second mixer in the quiescent period.

5. The time-division receiver according to claim 2, wherein the initializer includes a voltage source, and a switch that connects the voltage source and an output path for the mixer in the quiescent period.

6. The time-division receiver according to claim 1, wherein:
the mixer is a direct sampling mixer including a sampler and a switched capacitor filter; and
the initializer initializes a charge remaining in a parasitic capacitance, the parasitic capacitance being generated on at least one of a path between the sampler and the switched capacitor filter and a path between the switched capacitor filter and the demultiplexer, when the first branch signal has passed through the path, before the second branch signal passes through the path.

7. A time-division receiving method comprising:
down-converting a time-division multiplexed signal resulting from a plurality of branch signals being time-division multiplexed;
demultiplexing the time-division multiplexed signal that has been down-converted into respective branch signals; and initializing a charge remaining in a parasitic capacitance, the parasitic capacitance being generated on a path through which the down-converted time-division multiplexed signal passes, when a first branch signal has passed through the path, before a second branch signal passes through the path.

\* \* \* \* \*